US012423879B2

(12) United States Patent
Rho et al.

(10) Patent No.: US 12,423,879 B2
(45) Date of Patent: Sep. 23, 2025

(54) ELECTRONIC DEVICE AND METHOD FOR ANCHORING OF AUGMENTED REALITY OBJECT

(71) Applicant: Samsung Electronics Co., Ltd., Suwon-si (KR)

(72) Inventors: Minjin Rho, Suwon-si (KR); Doil Kwon, Suwon-si (KR); Jaeyong Lee, Suwon-si (KR); Insun Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 385 days.

(21) Appl. No.: 17/989,193

(22) Filed: Nov. 17, 2022

(65) Prior Publication Data

US 2023/0154060 A1 May 18, 2023

Related U.S. Application Data

(63) Continuation of application No. PCT/KR2022/018078, filed on Nov. 16, 2022.

(30) Foreign Application Priority Data

Nov. 17, 2021 (KR) .......................... 10-2021-0158812

(51) Int. Cl.
*G06T 11/00* (2006.01)
*G06F 3/01* (2006.01)
(Continued)

(52) U.S. Cl.
CPC .............. *G06T 11/00* (2013.01); *G06F 3/012* (2013.01); *G06V 10/764* (2022.01); *G06V 20/20* (2022.01)

(58) Field of Classification Search
CPC ....... G06T 11/00; G06T 19/006; G06T 19/00; G06V 20/20; G06V 10/764; G06F 3/012;
(Continued)

(56) References Cited

U.S. PATENT DOCUMENTS 9,081,177 B2 * 7/2015 Wong ................. G02B 27/0172
9,378,592 B2 * 6/2016 Kim ....................... G06F 3/017
(Continued)

FOREIGN PATENT DOCUMENTS

EP           3 137 982 B1    2/2019
KR    10-2012-0083147 A      7/2012
(Continued)

OTHER PUBLICATIONS

International Search Report with Written Opinion and English translation dated Feb. 15, 2023; International Appln. No. PCT/KR2022/018078.
(Continued)

*Primary Examiner* — Charles L Beard
(74) *Attorney, Agent, or Firm* — Jefferson IP Law, LLP

(57) ABSTRACT

An electronic device and a method for anchoring an augmented reality object are provided. The electronic device includes a memory, a display and at least one processor operatively connected with the memory and the display. The at least one processor may be configured to control the display to display at least one augmented reality object on an augmented reality space, obtain anchoring attribute information designated to the at least one augmented reality object, identify an anchoring type of content anchored to the at least one augmented reality object according to a user's motion based on the anchoring attribute information, and control the display to display a visual effect representing the anchoring type to the content.

17 Claims, 16 Drawing Sheets

(51) Int. Cl.
*G06V 10/764* (2022.01)
*G06V 20/20* (2022.01)

(58) Field of Classification Search
CPC . G06F 3/01; G06F 3/011; G06F 3/014; G06F 3/017; G06F 3/0304; G06F 3/04815
See application file for complete search history.

(56) References Cited

U.S. PATENT DOCUMENTS

| | | | | |
|---|---|---|---|---|
| 9,727,132 | B2* | 8/2017 | Liu | G06F 3/012 |
| 9,791,921 | B2* | 10/2017 | Poulos | G06F 3/013 |
| 10,019,131 | B2* | 7/2018 | Welker | G06F 3/017 |
| 10,152,136 | B2* | 12/2018 | Cohen | G06F 3/0483 |
| 10,248,192 | B2* | 4/2019 | Lehman | G06F 3/017 |
| 10,310,704 | B2* | 6/2019 | Meganathan | H04W 4/029 |
| 10,353,532 | B1* | 7/2019 | Holz | G06F 3/04847 |
| 10,429,941 | B2* | 10/2019 | Kamoda | G06F 3/011 |
| 10,559,086 | B1* | 2/2020 | Miller | H04N 23/45 |
| 10,602,046 | B2* | 3/2020 | Pan | H04N 23/661 |
| 10,699,087 | B1 | 6/2020 | Ozserin et al. | |
| 10,740,976 | B2* | 8/2020 | Short | G06F 3/04815 |
| 10,782,657 | B2* | 9/2020 | Gordon | G05B 15/02 |
| 10,831,268 | B1* | 11/2020 | Golard | G06F 3/167 |
| 10,841,174 | B1* | 11/2020 | Ely | G06F 3/04817 |
| 11,263,826 | B1* | 3/2022 | Gordon | G06F 3/011 |
| 11,314,399 | B2* | 4/2022 | Davis | G02B 27/0093 |
| 11,348,316 | B2* | 5/2022 | Burns | G06T 19/006 |
| 11,610,381 | B2* | 3/2023 | Mihara | G06T 19/00 |
| 11,714,592 | B2* | 8/2023 | Bar-Zeev | G06F 3/1423 715/863 |
| 11,782,570 | B2* | 10/2023 | Hsiao | G06F 3/04815 715/736 |
| 2003/0184602 | A1* | 10/2003 | Kuroki | G02B 27/017 715/856 |
| 2012/0113223 | A1* | 5/2012 | Hilliges | G06F 3/011 348/46 |
| 2012/0249416 | A1* | 10/2012 | Maciocci | H04N 9/3173 345/156 |
| 2013/0326364 | A1* | 12/2013 | Latta | G06F 3/012 715/751 |
| 2013/0335303 | A1* | 12/2013 | Maciocci | G02B 27/017 345/8 |
| 2014/0104274 | A1* | 4/2014 | Hilliges | G06F 3/017 345/424 |
| 2014/0204002 | A1* | 7/2014 | Bennet | G06F 3/017 345/7 |
| 2014/0225918 | A1 | 8/2014 | Mittal et al. | |
| 2015/0084857 | A1* | 3/2015 | Kimura | G06F 1/163 345/156 |
| 2015/0156803 | A1* | 6/2015 | Ballard | H04N 23/635 455/422.1 |
| 2015/0317831 | A1* | 11/2015 | Ebstyne | G06F 3/011 345/419 |
| 2015/0317833 | A1* | 11/2015 | Ebstyne | G02B 27/017 345/633 |
| 2016/0034039 | A1* | 2/2016 | Maeda | G06F 3/04842 715/810 |
| 2016/0196692 | A1* | 7/2016 | Kjallstrom | G06T 19/006 345/633 |
| 2016/0269578 | A1* | 9/2016 | Nozawa | G06T 11/60 |
| 2016/0274762 | A1* | 9/2016 | Lopez | G06T 19/006 |
| 2017/0115488 | A1* | 4/2017 | Ambrus | G02B 27/0172 |
| 2017/0221264 | A1* | 8/2017 | Perry | G06F 3/011 |
| 2018/0075657 | A1* | 3/2018 | Lanier | G06F 3/011 |
| 2018/0136465 | A1* | 5/2018 | Chi | G06F 3/0416 |
| 2018/0157398 | A1* | 6/2018 | Kaehler | G06V 10/464 |
| 2018/0190023 | A1 | 7/2018 | Anderson | |
| 2018/0286126 | A1* | 10/2018 | Schwarz | G06F 3/04845 |
| 2018/0350145 | A1* | 12/2018 | Byl | G06F 3/017 |
| 2019/0018498 | A1 | 1/2019 | West et al. | |
| 2019/0129607 | A1* | 5/2019 | Saurabh | G06F 3/011 |
| 2019/0197785 | A1* | 6/2019 | Tate-Gans | G06T 19/006 |
| 2019/0272674 | A1* | 9/2019 | Comer | G06F 3/04815 |
| 2019/0304146 | A1 | 10/2019 | Buschbeck et al. | |
| 2019/0332182 | A1* | 10/2019 | Shen | G06F 3/011 |
| 2020/0082633 | A1 | 3/2020 | Rom et al. | |
| 2020/0129850 | A1* | 4/2020 | Ohashi | G06F 3/012 |
| 2020/0193150 | A1* | 6/2020 | Shreve | G06V 20/52 |
| 2020/0211297 | A1* | 7/2020 | Dai | G06F 3/017 |
| 2020/0258481 | A1* | 8/2020 | Woo | G06T 11/00 |
| 2020/0409452 | A1* | 12/2020 | Nguyen | G06T 19/20 |
| 2021/0004146 | A1* | 1/2021 | Linville | G06F 3/0304 |
| 2021/0110646 | A1* | 4/2021 | Dixit | G06V 20/20 |
| 2021/0191600 | A1* | 6/2021 | Lemay | G06F 3/013 |
| 2021/0209364 | A1* | 7/2021 | Park | G06F 3/013 |
| 2021/0233496 | A1 | 7/2021 | Babu JD | |
| 2021/0248835 | A1* | 8/2021 | Wiley | G06F 3/04842 |
| 2021/0311542 | A1* | 10/2021 | Brown | G06F 3/017 |
| 2021/0358294 | A1* | 11/2021 | Parashar | G08C 17/02 |
| 2022/0091664 | A1* | 3/2022 | Kim | G06T 19/006 |
| 2022/0172405 | A1* | 6/2022 | Meekhof | G06F 3/04815 |
| 2022/0319128 | A1* | 10/2022 | Bazin | G06T 7/70 |
| 2023/0098951 | A1* | 3/2023 | Kim | G06F 3/03 345/633 |
| 2023/0130770 | A1* | 4/2023 | Miller | G06N 20/00 345/156 |
| 2023/0135420 | A1* | 5/2023 | Lee | G06F 3/04817 345/156 |
| 2023/0256297 | A1* | 8/2023 | Canberk | G02B 27/017 482/8 |
| 2023/0305635 | A1* | 9/2023 | Han | G06F 3/04847 |
| 2023/0315247 | A1* | 10/2023 | Pastrana | G06F 3/165 715/716 |
| 2024/0134493 | A1* | 4/2024 | Bassett | G06F 3/0482 |
| 2024/0143243 | A1* | 5/2024 | Hara | G06F 3/1238 |
| 2024/0168542 | A1* | 5/2024 | Klein | G06F 3/011 |
| 2024/0169603 | A1* | 5/2024 | Moon | G06T 11/00 |
| 2024/0402795 | A1* | 12/2024 | Klein | G06F 3/04883 |

FOREIGN PATENT DOCUMENTS

| | | |
|---|---|---|
| KR | 10-2013-0137692 A | 12/2013 |
| KR | 10-2015-0116871 A | 10/2015 |
| KR | 10-2016-0128119 A | 11/2016 |
| KR | 10-2019-0117415 A | 10/2019 |
| KR | 10-2020-0098034 A | 8/2020 |
| KR | 10-2183115 B1 | 11/2020 |
| KR | 10-2228340 B1 | 3/2021 |
| WO | 2019/185674 A1 | 10/2019 |

OTHER PUBLICATIONS

Pedestride Crowd; Simple HoloLens 2 Example; https://youtu.be/jRdu6r3qUag?t=76; Feb. 2021.
Extended European Search Report dated Oct. 22, 2024; European Appln. No. 22896051.4-1218 / 4372527 PCT/KR2022018078.
Indian Office Action dated Jul. 29, 2025, issued in an Indian Patent Application No. 202447044952.

* cited by examiner

ELECTRONIC DEVICE AND METHOD FOR ANCHORING OF AUGMENTED REALITY OBJECT

CROSS-REFERENCE TO RELATED APPLICATION(S)

This application is a continuation application, claiming priority under § 365(c), of an International application No. PCT/KR2022/018078, filed on Nov. 16, 2022, which is based on and claims the benefit of a Korean patent application number 10-2021-0158812, filed on Nov. 17, 2021, in the Korean Intellectual Property Office, the disclosure of which is incorporated by reference herein in its entirety.

BACKGROUND

1. Technical Field

The disclosure relates to an electronic device and method for anchoring an augmented reality object.

2. Description of Related Art

Recent electronic devices come in various form factors for user convenience purposes and provide diversified services or functions. Among information according to the execution of various services or functions of the electronic device, various services are provided by augmented reality technology.

Augmented reality (AR) is part of virtual reality and is a computer graphic scheme that allows a virtual object to look present in the original environment by synthesizing the virtual object or information with the actual environment. Augmented reality (AR) is a technique showing the user an overlap of the virtual thing on the real-life world the user sees with his eyes. It shows a single image obtained by mixing additional information and virtual world with the real world in real-time, and thus, it is also called mixed reality (MR).

As smartphones are recently in wide use, AR technology happens to have various applications in various reality environments, and its uses are expanding, such as location-based services, mobile games, or education sectors. Augmented reality technology may provide an anchoring scheme for fixing objects displayed in augmented reality space.

The above information is presented as background information only to assist with an understanding of the disclosure. No determination has been made, and no assertion is made, as to whether any of the above might be applicable as prior art with regard to the disclosure.

SUMMARY

When displaying information in an augmented reality environment, various virtual objects may be widely spread and displayed around the user since there is no limitation to space. The conventional augmented reality technology does not consider classification criteria depending on the user's motion and context for each virtual object and fragmented, causing confusion to the user.

The conventional augmented reality technology provides different anchoring schemes on information provided in augmented reality depending on the user's body motion (e.g., head/hand/body) and, when the attribute of the object and environment are changed by the operation of matching the virtual object information to the real environment depending on the user's interaction, the anchoring scheme between the user and the corresponding virtual object may be changed. However, the user has difficulty in perceiving the change of the anchoring scheme in the conventional augmented reality technology.

Aspects of the disclosure are to address at least the above-mentioned problems and/or disadvantages and to provide at least the advantages described below. Accordingly, an aspect of the disclosure is to provide an electronic device and method for anchoring an augmented reality object for the user to recognize the anchoring scheme (or anchoring type) depending on the attribute of the object displayed in the augmented reality space and user context.

Additional aspects will be set forth in part in the description which follows and, in part, will be apparent from the description, or may be learned by practice of the presented embodiments.

In accordance with an aspect of the disclosure, an electronic device is provided. The electronic device includes a memory, a display and at least one processor operatively connected with the memory and the display. The at least one processor may be configured to control the display to display at least one augmented reality object on an augmented reality space, obtain anchoring attribute information designated to the at least one augmented reality object, identify an anchoring type of content anchored to the at least one augmented reality object according to a user's motion based on the anchoring attribute information, and control the display to display a visual effect representing the anchoring type to the content.

In accordance with another aspect of the disclosure, a method for operation in an electronic device is provided. The method includes controlling a display of the electronic device to display at least one augmented reality object on an augmented reality space, obtaining anchoring attribute information designated to the at least one augmented reality object, identifying an anchoring type of content anchored to the at least one augmented reality object according to a user's motion based on the anchoring attribute information, and controlling the display of the electronic device to display a visual effect representing the anchoring type to the content.

According to an embodiment, the electronic device and method for anchoring an augmented reality object may apply the visual effect representing the type of anchoring depending on the attribute of the object displayed in the augmented reality space to the content anchored to the object and display it, thus allowing the user to easily recognize a change in the anchoring type of the augmented reality object by the user's motion or user interaction, and may display the anchoring type of augmented reality objects irregularly dispersed around the user per attribute of each object depending on the user's motion, thereby allowing the user to easily recognize the anchoring type applied to each object.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the term "user" may denote a human or another device using the electronic device.

Figure 1:
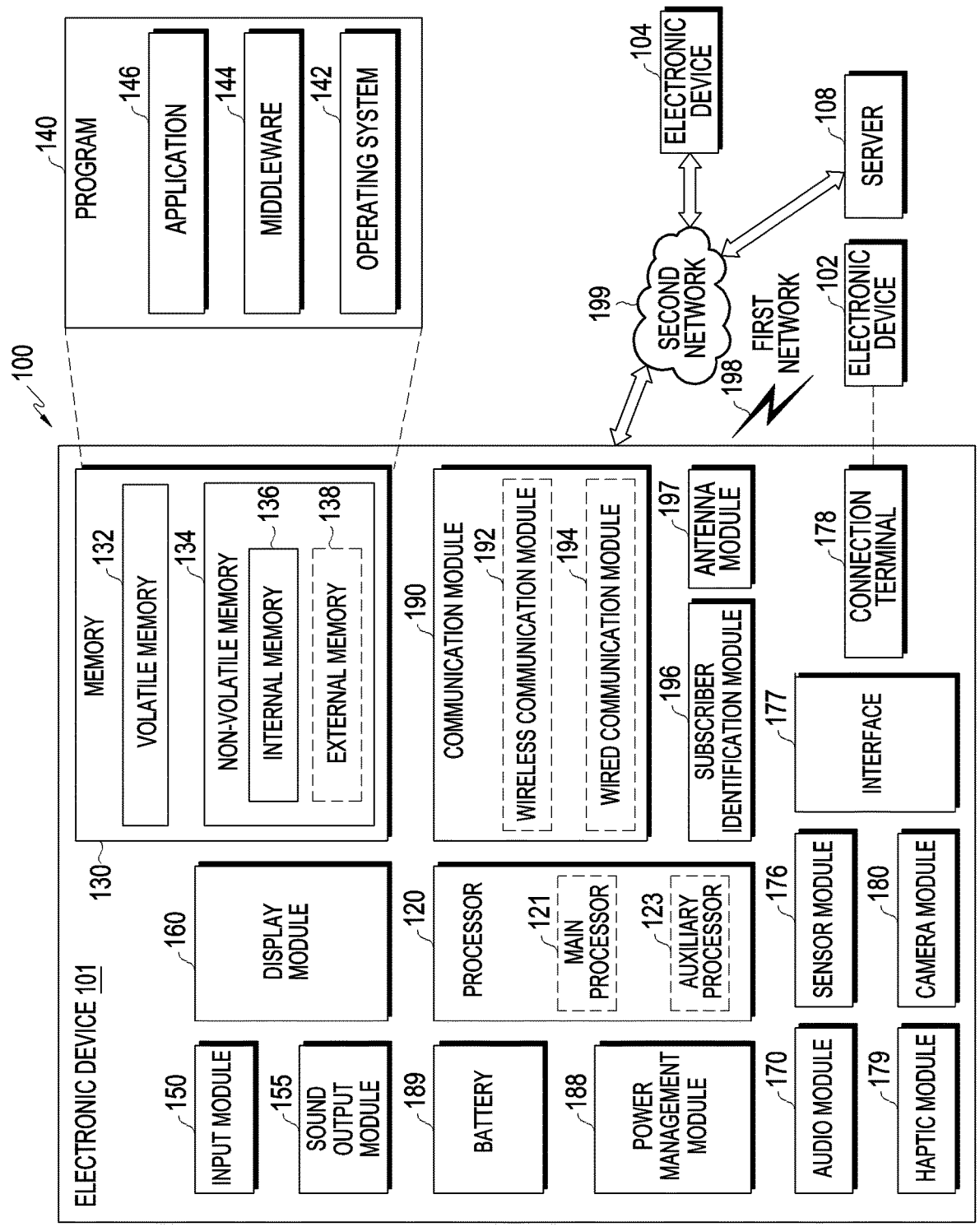
FIG. 1 is a view illustrating a network environment according to various embodiments of the disclosure.

FIG. 1 is a block diagram illustrating an electronic device 101 in a network environment 100 according to various embodiments of the disclosure.

Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a fifth generation (5G) network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2:
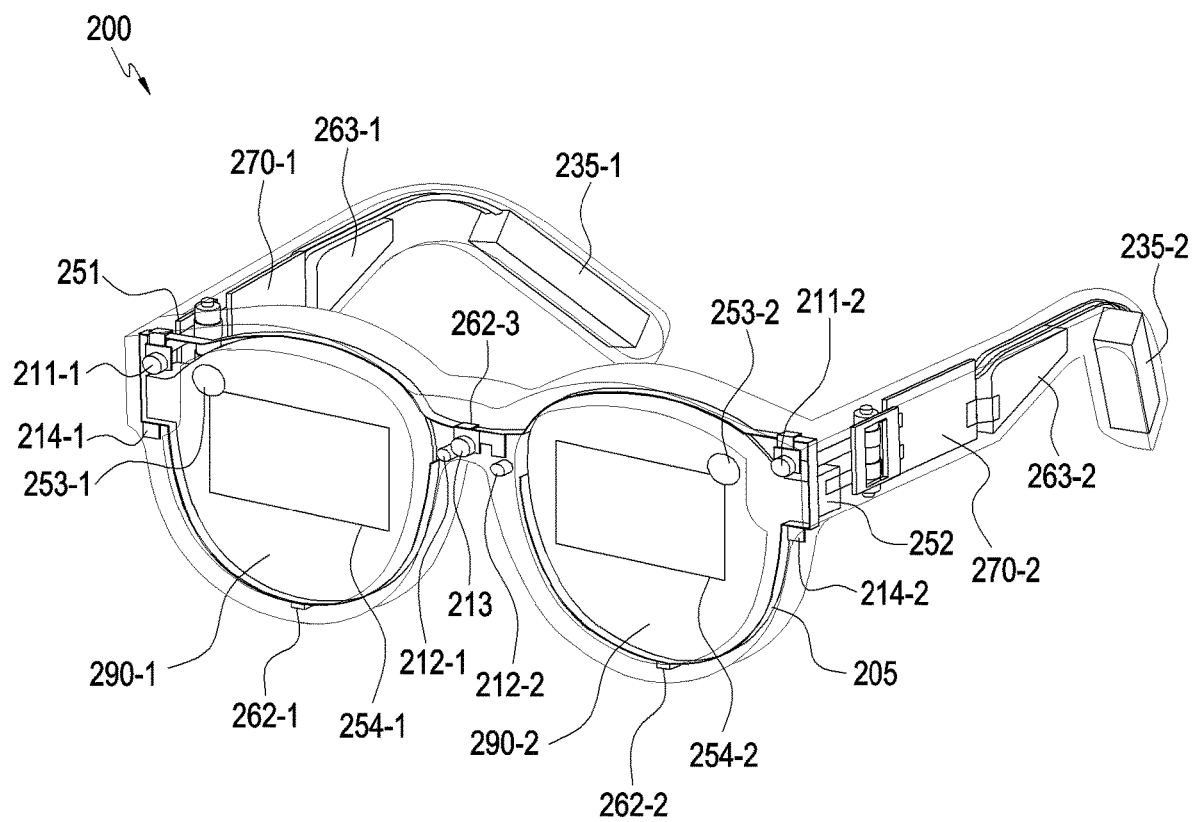
FIG. 2 is a perspective view illustrating an electronic device that provides augmented reality technology according to an embodiment of the disclosure.

FIG. 2 is a perspective view illustrating an electronic device that provides augmented reality technology according to an embodiment of the disclosure.

Referring to FIGS. 1 and 2, according to an embodiment, an electronic device 200 may be the electronic device 101 of FIG. 1 or an electronic device 102 or 104 communicating with the electronic device 101 of FIG. 1 or a device capable of providing a service related to augmented reality technology in an extended reality environment (XR) encompassing augmented reality (AR) or mixed reality (MR), similar to the electronic device 101 of FIG. 1. As shown in FIG. 2, the electronic device 200 may be a device (e.g., a head-mounted display (HMD) or glasses-type AR glasses device) configured to be worn on the user's body. For example, the electronic device 200 may be configured to couple with an external electronic device, e.g., a mobile device to be able to use the components (e.g., the display module, camera module, sound output module, or other components) of the external electronic device. Without limited thereto, the electronic device 200 may be implemented in other various forms wearable on the user's body.

According to an embodiment, the electronic device 200 may control the display module 160 to configure an augmented reality space which displays an augmented reality image (e.g., two-dimensional (2D) or three-dimensional (3D) image) corresponding to the real environment captured in the ambient environment where the user is positioned and to display at least one augmented reality object for user interaction in the augmented reality space.

According to an embodiment, the electronic device 200 may include a processor 120, a memory 130, a display module 160, a sensor module 176, a camera module 180 including a plurality of cameras, a charging module (e.g., the battery 189 of FIG. 1), and a communication module 190. The electronic device 200 may further include a sound output module 155, an input module 150, or other components shown in FIG. 1. In addition, the electronic device 200 may further include other components necessary to provide an augmented reality function (e.g., a service or scheme).

Referring back to FIG. 2, the electronic device 200 according to an embodiment is described. As described above, the electronic device 200 is not limited to the glasses-type (e.g., AR glasses) augmented reality device, and it may be implemented as various devices capable of providing immersive content (e.g., XR technology-based content) to the user's eyes (e.g., AR head mounted-type display type, 2D/3D head-mounted display device, or VR head-mounted display device).

According to an embodiment, the electronic device 200 may include one or more first cameras 211-1 and 211-2, one or more second cameras 212-1 and 212-2, and one or more third cameras 213. According to an embodiment, an image obtained through the one or more first cameras 211-1 and 211-2 may be used for detection of the user's hand gesture, tracking the user's head, and/or spatial recognition. The one or more first cameras 211-1 and 211-2 may be a global shutter (GS) camera or a rolling shutter (RS) camera. According to an embodiment, the one or more first cameras 211-1 and 211-2 may perform a simultaneous localization and mapping (SLAM) operation through depth capture. The one or more first cameras 211-1 and 211-2 may perform spatial recognition for 3 degrees of freedom (DoF) and/or 6 DoF.

According to an embodiment, an image obtained through the one or more second cameras 212-1 and 212-2 may be used to detect and track the user's pupil. The one or more second cameras 212-1 and 212-2 may be GS cameras. The one or more second cameras 212-1 and 212-2 may correspond to the left eye and the right eye, respectively. The one or more second cameras 212-1 and 212-2 may have the same performance. The one or more third cameras 213 may be high-resolution cameras. The one or more third cameras 213 may perform an auto-focusing (AF) function and an optical image stabilization (OIS) function. According to an embodiment, the one or more third cameras 213 may be a GS camera or a rolling shutter (RS) camera. According to an embodiment, the one or more third cameras 213 may be color cameras.

According to an embodiment, the electronic device 200 may include one or more light emitting devices 214-1 and 214-2. The light emitting elements 214-1 and 214-2 are different from a light source, which is described below, for irradiating light to a screen output area of the display. According to an embodiment, the light emitting devices 214-1 and 214-2 may irradiate light to facilitate pupil detection in detecting and tracking the user's pupils through the one or more second cameras 212-1 and 212-2. According to an embodiment, each of the light emitting devices 214-1 and 214-2 may include an LED. According to an embodiment, the light emitting devices 214-1 and 214-2 may irradiate light in an infrared band. According to an embodiment, the light emitting devices 214-1 and 214-2 may be attached around the frame of the augmented reality device 200. According to an embodiment, the light emitting devices 214-1 and 214-2 may be positioned around the one or more first cameras 211-1 and 211-2 and may assist in gesture detection, head tracking, and spatial recognition by the one or more first cameras 211-1 and 211-2 when the augmented reality device 200 is used in a dark environment. According to an embodiment, the light emitting devices 214-1 and 214-2 may be positioned around the one or more third cameras 213 and may assist in obtaining images by the one or more third cameras 213 when the augmented reality device 200 is used in a dark environment.

According to an embodiment, the electronic device 200 may include batteries 235-1 and 235-2. The batteries 235-1 and 235-2 may store power for operating the remaining components of the augmented reality device 200.

According to an embodiment, the electronic device 200 may include a first display 251, a second display 252, one or more input optical members 253-1 and 253-2, and one or more transparent members 290-1 and 290-2, and one or more screen display portions 254-1 and 254-2. According to an embodiment, the first display 251 and the second display 252 may include, e.g., a liquid crystal display (LCD), a digital mirror device (DMD), a liquid crystal on silicon (LCoS), or an organic light emitting diode (OLED), or a micro light emitting diode (micro LED). According to an embodiment, when the first display 251 and the second display 252 are formed of one of a liquid crystal display device, a digital mirror display device, or a silicon liquid crystal display device, the augmented reality device 200 may include a light source for irradiating light to a screen output area of the display. According to an embodiment, when the first display 251 and the second display 252 may generate light on their own, e.g., when formed of either organic light emitting diodes or micro LEDs, the augmented reality device 200 may provide a virtual image of good quality to the user even when a separate light source is not included.

According to an embodiment, the one or more transparent members 290-1 and 290-2 included in the electronic device 200 may be disposed to face the user's eyes when the user wears the augmented reality device 200. The one or more transparent members 290-1 and 290-2 may include at least one of a glass plate, a plastic plate, and a polymer. The user may view the outside world through the one or more transparent members 290-1 and 290-2 when the user wears the augmented reality device 200.

According to an embodiment, the one or more input optical members 253-1 and 253-2 included in the electronic device 200 may guide the light generated by the first display 251 and the second display 252 to the user's eyes. An image may be formed on the one or more screen display portions 254-1 and 254-2 over the one or more transparent members 290-1 and 290-2 by the light generated by the first display 251 and the second display 252, and the user may see the image formed on the one or more screen display portions 254-1 and 254-2.

According to an embodiment, the electronic device 200 may include one or more optical waveguides (not shown). The optical waveguide may transfer the light generated by the first display 251 and the second display 252 to the user's eyes. The augmented reality device 200 may include one optical waveguide corresponding to each of the left eye and the right eye. According to an embodiment, the optical waveguide may include at least one of glass, plastic, or polymer. According to an embodiment, the optical waveguide may include a nano-pattern formed inside or on one outer surface, e.g., a polygonal or curved grating structure. According to an embodiment, the optical waveguide may include a free-form type prism, and in this case, the optical waveguide may provide incident light to the user through a reflective mirror. According to an embodiment, the optical waveguide may include at least one of at least one diffractive element (e.g., a diffractive optical element (DOE) or a holographic optical element (HOE)) or a reflective element (e.g., a reflective mirror) and guide the display light emitted from the light source to the user's eyes using at least one diffractive element or reflective element included in the optical waveguide. According to an embodiment, the diffractive element may include input/output optical elements. According to an embodiment, the reflective element may include a member causing total reflection.

According to an embodiment, the electronic device 200 may include one or more sound input devices 262-1, 262-2, and 262-3 and one or more sound output devices 263-1 and 263-2.

According to an embodiment, the electronic device 200 may include a first PCB 270-1 and a second PCB 270-2. The first PCB 270-1 and the second PCB 270-2 may transfer electrical signals to components included in the augmented reality device 200, such as the first cameras 211-1 and 211-2, the second cameras 212, and the third cameras 213 included in the camera module 180, the display module 160, the audio module 170, and the sensor module 176. According to an embodiment, the first PCB 270-1 and the second PCB 270-2 may be FPCBs. According to an embodiment, the first PCB 270-1 and the second PCB 270-2 each may include a first substrate, a second substrate, and an interposer disposed between the first substrate and the second substrate.

Figure 3A:
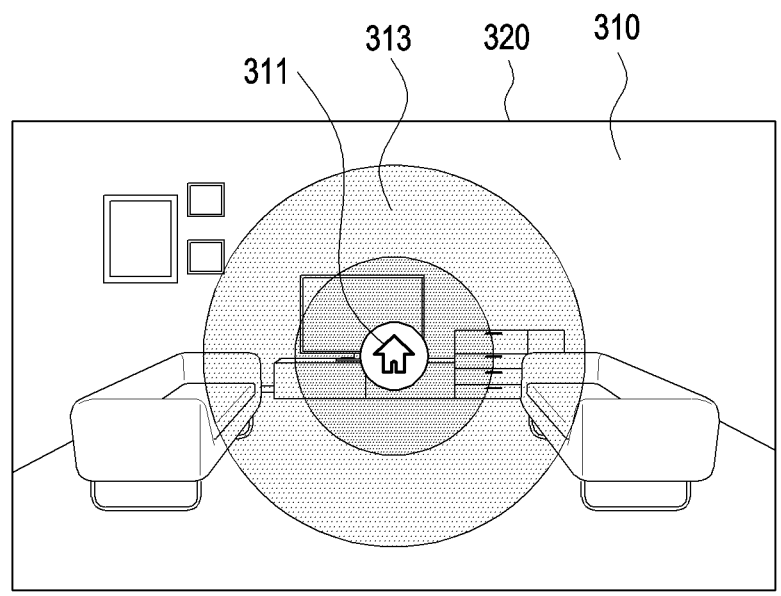
FIGS. 3A and 3B are views illustrating an example of an anchoring scheme in an augmented reality space in an electronic device according to an embodiment of the disclosure.
Figure 3A:
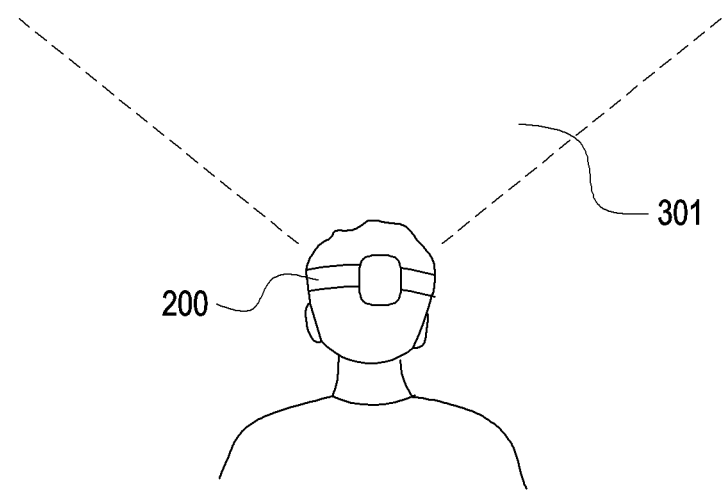
Figure 3B:
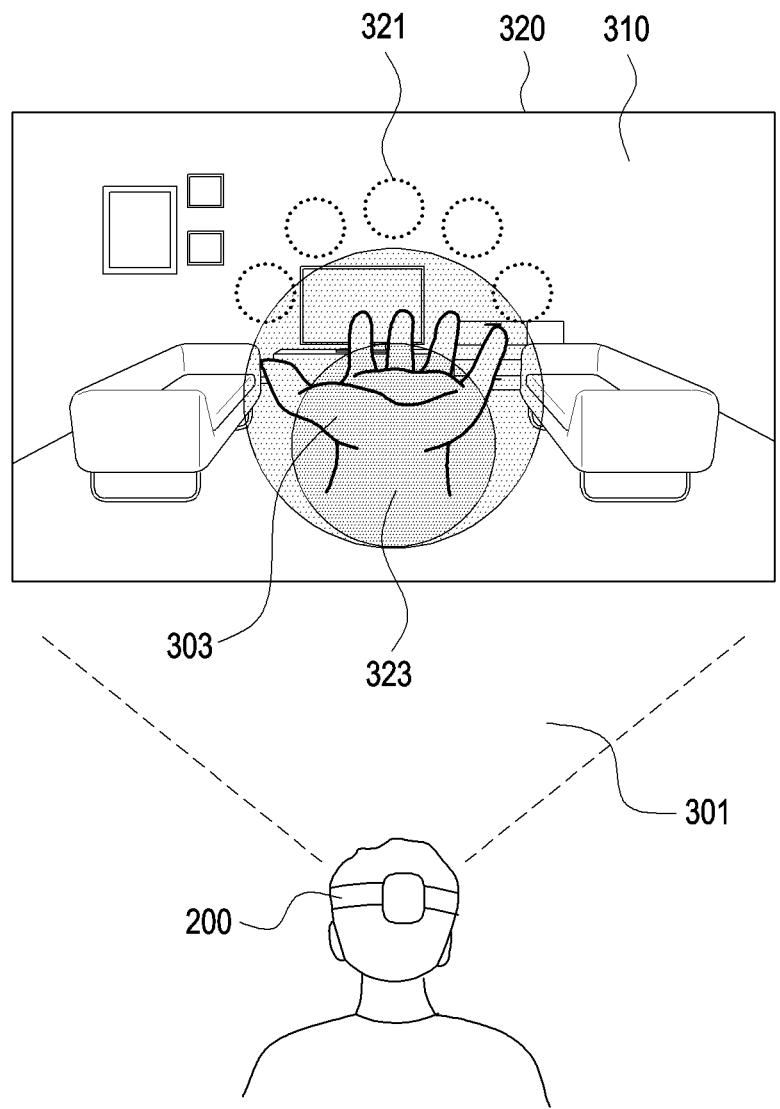

FIGS. 3A and 3B are views illustrating an example of an anchoring scheme in an augmented reality space in an electronic device according to an embodiment of the disclosure.

Referring to FIGS. 1, 2, 3A, and 3B, according to an embodiment, the processor 120 may be electrically connected to other components of the electronic device 200 (e.g., the electronic device 101 of FIG. 1) and may control the other components. The processor 120 may perform various data processing or computations according to the execution of various functions (e.g., operations, services, or programs) provided by the electronic device 200. The processor 120 may perform various data processing or computations to display the image 320 captured for the real ambient environment in the augmented reality space 310 and to display, on the augmented reality space 310, at least one augmented reality object 311 or 321 (e.g., a home menu or execution icons) for user interaction in relation to actual things included in the captured image 320. The processor 120 may perform various data processing or computations to represent an anchoring scheme for the augmented reality object 311 or 321 displayed in the augmented reality space to be recognized by the user.

According to an embodiment, as shown in FIGS. 3A and 3B, the processor 120 may control the display module 160 (e.g., the first display 251 and second display 252 of FIG. 2) to display the image (e.g., 2D image or 3D image) corresponding to the real ambient environment captured by the camera module 180 (e.g., the first camera 211-1 or 211-2 of FIG. 2).

According to an embodiment, the processor 120 may control the display module 160 to display at least one augmented reality object 311 or 321 on the augmented reality space 310. As shown in FIGS. 3A and 3B, the processor 120 may display the augmented reality object 311 or 321 for user interaction on the augmented reality space 310. The augmented reality object 311 or 321 may be displayed to overlap the image 320 to be identified by the user wearing the electronic device 200 in the user's field-of-view area (e.g., field of vision (FOV) area) 301. The processor 120 may arrange or display at least one other augmented reality object (not shown) on the augmented reality space in relation to the image 320. Some of the augmented reality objects arranged on the augmented reality space 310 may be disposed outside the user's field-of-view area 301 and, if included in the user's field-of-view area 301 according to the direction of the user's motion, they may be displayed to be viewed by the user.

According to an embodiment, as shown in FIGS. 3A and 3B, the processor 120 may apply an anchoring scheme to the augmented reality object 311 or 321 to provide content 313 or 323 fixed overlapping or adjacent to the augmented reality object 311 or 321. The processor 120 may control the display module 160 to fix the content 313 or 323 anchored to at least one augmented reality object 311 or 321 to a designated position of the augmented reality space 310 or move it according to the user's motion (e.g., a motion of the hand 303) and display it. The processor 120 may apply a visual effect (e.g., color, gradation effect, shadow effect, effects effect or graphic element (mark or symbol)) to the content 313 or 323 to allow the user to recognize that the augmented reality object 311 or 321 is anchored. The processor 120 may obtain anchoring attribute information designated to the augmented reality object 311 or 321 to display the content 313 or 323 anchored to the augmented reality object 311 or 321 and identify the anchoring type designated to the augmented reality object 311 or 321 based on the anchoring attribute information. Here, the anchoring attribute information may include at least one of identification information about the anchoring type applicable to the augmented reality object 311 or 321, information related to the visual effect to be applied (e.g., color, shadow, shading, gradation effect, shadow effect, magnify effect, or graphic element (mark or symbol)), display position information, or association information indicating the association with other content.

According to an embodiment, the processor 120 may apply a different visual effect per anchoring type. For example, the anchoring types may include at least one of a space anchoring type, a hand anchoring type, a head anchoring type, a body anchoring type, or an object anchoring type. For example, as shown in FIG. 3A, the content 313 anchored to the augmented reality object 311 displayed on the augmented reality space 310 may be anchored by the space anchoring type and be displayed, with a visual effect (e.g., magnify effect) representing space anchoring applied thereto. For example, as shown in FIG. 3B, the content 323 anchored to the augmented reality object 321 displayed on the augmented reality space 310 may be anchored by the hand anchoring type and be displayed, with a visual effect (e.g., display in a different color and display of a hand animation) representing hand anchoring applied thereto.

According to an embodiment, if the user selects the content 313 anchored to the augmented reality object 311, the processor 120 may control to execute the function designated to the augmented reality object 311 and change the object attribute and display the changed object 321 as shown in FIGS. 3A and 3B. The processor 120 may identify the anchoring type (e.g., hand anchoring) based on the anchoring attribute information designated to the changed object 321 and control the display module 160 to display the content 323 to which the visual effect representing the anchoring type has been applied. The processor 120 may detect the user's motion (e.g., hand motion) and control the display module 160 to move and display the visual effect-applied content 323 according to the user's motion. The processor 120 may display the content 323 including an animation according to the user's motion and display the visual effect of the content 323 differently (e.g., in a different color) from the visual effect of the content 313.

Referring back to FIGS. 1 and 2, according to an embodiment, when the identified anchoring type is the space anchoring type, the processor 120 may control the display module 160 to display the content anchored to overlap or adjacent to the augmented reality object to be fixed in a designated position of the augmented reality space. Here, the content is fixed and displayed in the designated position without being moved according to the user's motion. The processor 120 may control the display module 160 to apply and display the visual effect, which represents the space anchoring type to allow the user to recognize space anchoring, to the content.

According to an embodiment, when the anchoring type is the hand anchoring type, the processor 120 may control the display module 160 to move and display the content anchored overlapping or adjacent to the augmented reality object according to the motion of the user's hand with respect to the user's head. The processor 120 may control the display module 160 to apply the visual effect representing the hand anchoring type to allow the user to recognize space anchoring to the content and display it. Upon detecting that the user's hand departs from the field-of-view area, the processor 120 may control the display module 160 to apply such an effect as if the content disappears out of the field-of-view area and display the content to be transparent or disappear. Upon detecting entry of the user's hand into the field-of-view area, the processor 120 may control the display module 160 to apply such an effect as if the content appears back or to display the content back.

According to an embodiment, when the anchoring type is the head anchoring type, the processor 120 may control the display module 160 to move and display the content anchored overlapping or adjacent to the augmented reality object according to the motion of the user's head. The processor 120 may control the display module 160 to move and display the content anchored overlapping or adjacent to the augmented reality object 1011 according to the motion of the user's head. The processor 120 may control the display module 160 to apply the visual effect representing the head anchoring type to allow the user to recognize head anchoring type to the content and display it. The electronic device 200 may control the display module 160 to display the content not to depart from the user's field-of-view area.

According to an embodiment, when the anchoring type to be applied to the augmented reality object displayed in the augmented reality space is the body anchoring type, the processor 120 may control the display module 160 to move and display the content anchored overlapping or adjacent to the augmented reality object while maintaining a predetermined distance from the user's body according to the user's body motion. The processor 120 may control the display module 160 to apply the visual effect representing the body anchoring type to allow the user to recognize body anchoring type to the content and display it.

According to an embodiment, when the anchoring type to be applied to the augmented reality object displayed in the augmented reality space is the object anchoring type, the processor 120 may control the display module 160 to display the anchored content to maintain a predetermined distance, adjacent to the augmented reality object. The processor 120 may control the display module 160 to move and display the content according to the user's motion while maintaining a predetermined distance from the augmented reality object, with the augmented reality object fixed but not moved. The processor 120 may move (or rotate) and provide the content according to the user's motion so that the user is viewed all the time within the field-of-view area. The processor 120 may control the display module 160 to apply the visual effect representing the object anchoring type to allow the user to recognize object anchoring to the content and display it.

According to an embodiment, the processor 120 may determine a matching position to match the augmented reality object to the augmented reality space and move and display the augmented reality object to the determined matching position according to the user's motion. The processor 120 may match the augmented reality object to the determined matching position in the augmented reality space and, if the anchoring type of the augmented reality object is changed, the processor 120 may control the display module 160 to display a visual effect representing the changed anchoring type.

Main components of the electronic device 101 or 200 of FIGS. 1 and 2 have been described above in connection with FIGS. 1 and 2. According to an embodiment, however, all of the components of FIGS. 1 and 2 are not essential components, and the electronic device 101 or 200 may be implemented with more or less components than those shown. The positions of the major components of the electronic device 101 or 200 described above in connection with FIGS. 1 and 2 may be varied according to an embodiment of the disclosure.

According to an embodiment, an electronic device (e.g. the electronic device 101 of FIG. 1 and/or the electronic device 200 of FIG. 2) may comprise a memory (e.g., the memory 130 of FIG. 1), a display (e.g., the display module 160 of FIG. 1 or the first display 251 and second display 252 of FIG. 2), and at least one processor (e.g., the processor 120 of FIG. 1 operatively connected with the memory and the display. The at least one processor may be configured to control the display to display at least one augmented reality object on an augmented reality space, obtain anchoring attribute information designated to the at least one augmented reality object, identify an anchoring type of content anchored to the at least one augmented reality object according to a user's motion based on the anchoring attribute information, and control the display to display a visual effect representing the anchoring type to the content.

According to an embodiment, the at least one processor may be further configured to control the display to display the visual effect representing the identified anchoring type differently from a visual effect representing another anchoring type to allow the user to distinguish the identified anchoring type from the other anchoring type.

According to an embodiment, the at least one processor may be further configured to, based on an attribute of the at least one augmented reality object having changed, identify a change in another anchoring type according to the changed attribute, and control the display to display another visual effect representing the changed, other anchoring type to the content.

According to an embodiment, the at least one processor may be further configured to control the display to move and display the at least one augmented reality object based on the user's motion to match the at least one augmented reality object to the augmented reality space, determine a matching position in response to the user's motion, match the augmented reality object to an image corresponding to a real ambient environment displayed on the augmented reality space in the determined matching position, and based on the anchoring type of the augmented reality object having changed, control the display to display a visual effect representing the changed anchoring type.

According to an embodiment, the at least one processor may be further configured to, in a case in which the anchoring type is space anchoring, control the display to fix and display, in a designated position of the augmented reality space, content to which a visual effect representing the space anchoring is applied, while overlapping or being adjacent to the augmented reality object.

According to an embodiment, the at least one processor may be further configured to, in a case in which the anchoring type is a hand anchoring type, control the display to move and display content to which a visual effect representing the hand anchoring type is applied, according to a motion of the user's hand with respect to the user's head, while overlapping or being adjacent to the augmented reality object.

According to an embodiment, the at least one processor may be further configured to, in a case in which the anchoring type is head anchoring, control the display to move and display content to which a visual effect representing the head anchoring is applied, according to a motion of the user's head, while overlapping or being adjacent to the augmented reality object.

According to an embodiment, the at least one processor may be further configured to, in a case in which the anchoring type is body anchoring, control the display to move and display content to which a visual effect representing the body anchoring is applied, according to a motion of the user's body, while overlapping or being adjacent to the augmented reality object. The content may be moved while maintaining a predetermined distance from the user's body.

According to an embodiment, the at least one processor may be further configured to, in a case in which the anchoring type is object anchoring, control the display to display content to which a visual effect representing the object anchoring is applied while maintaining a designated distance from the augmented reality object and move and display the content according to the user's motion.

According to an embodiment, the at least one processor may be further configured to, in a case in which a plurality of augmented reality objects are displayed on the augmented reality space, control the display to display each of contents to which visual effects representing anchoring types respectively for the plurality of augmented reality objects are applied, identify an association between the plurality of augmented reality objects and classify objects associated with each other, and control the display to display a visual effect representing the association to the classified objects.

An operation method in an electronic device is described with reference to the above-described drawings.

Figure 4:
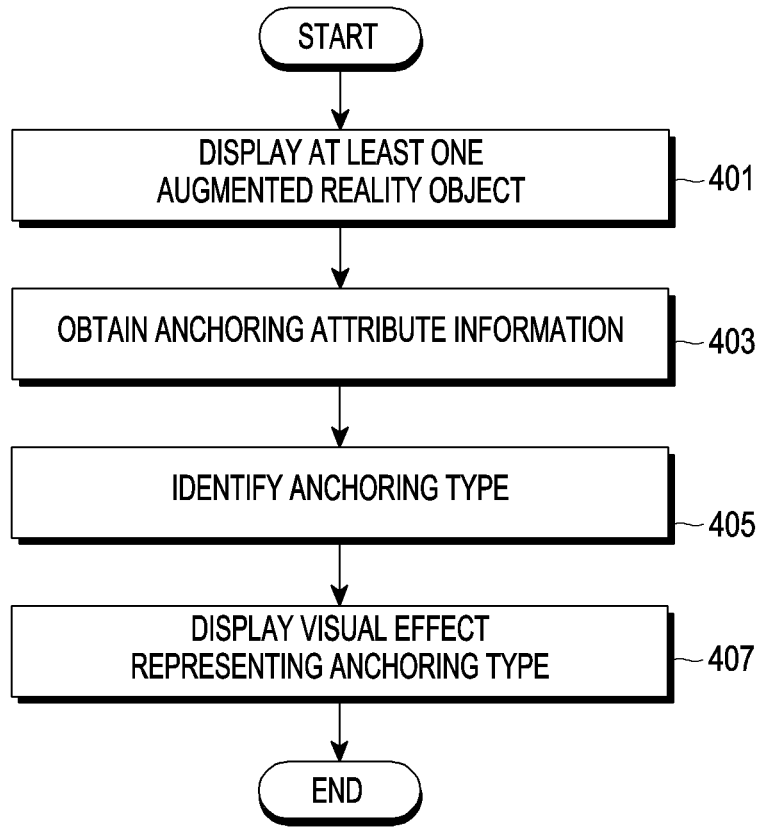
FIG. 4 is a flowchart illustrating an operation method in an electronic device according to an embodiment of the disclosure.

FIG. 4 is a view illustrating an example of an operation method in an electronic device according to an embodiment of the disclosure.

Referring to FIG. 4, according to an embodiment, an electronic device (e.g., the electronic device 101 of FIG. 1 or the electronic device 200 of FIG. 2) may display at least one augmented reality object on an augmented reality space in operation 401. The electronic device may display the image corresponding to the real ambient environment captured by the camera module (e.g., the camera module 180 of FIG. 1 or the first camera 211-1 or 211-2 of FIG. 2), on the augmented reality space. The electronic device may display at least one virtual augmented reality object on the augmented reality space by the display (e.g., the display module 160 of FIG. 1 or the first display 251 and second display 252 of FIG. 2) while overlapping the image.

In operation 403, the electronic device may obtain anchoring attribute information designated to the at least one augmented reality object. Here, the anchoring attribute information may include at least one of identification information about the anchoring type applicable to the augmented reality object, information related to the visual effect to be applied (e.g., color, shadow, gradation effect, shadow effect, effects effect, or graphic element (mark or symbol)), display position information, or association information indicating the association with other content.

In operation 405, the electronic device may identify the anchoring type of the content anchored to at least one augmented reality object according to the user's motion based on the anchoring attribute information. The content may be anchored overlapping or adjacent to at least one augmented reality object. The electronic device may fix the content anchored to at least one augmented reality object in a designated position of the augmented reality space or move and display it according to the user's motion.

In operation 407, the electronic device may display a visual effect (e.g., color, gradation effect, shadow effect, effects effect, or graphic element (mark or symbol)) representing the anchoring type to the content to allow the user to recognize the anchoring type. The electronic device may apply a different visual effect per anchoring type. For example, the anchoring types may include at least one of a space anchoring type, a hand anchoring type, a head anchoring type, a body anchoring type, or an object anchoring type.

An operation method in the electronic device is described in detail with reference to the operation method described above in connection with FIG. 4.

Figure 5:
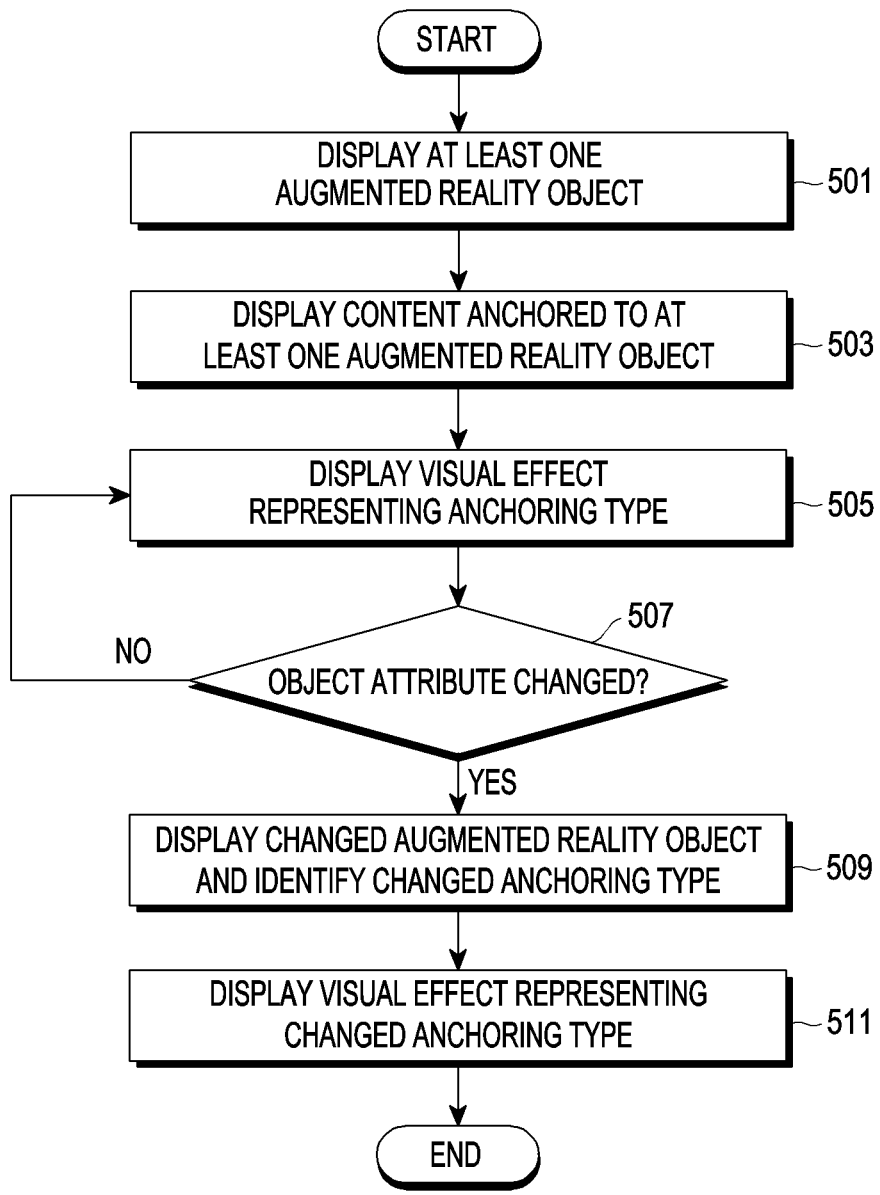
FIG. 5 is a flowchart illustrating an operation method in an electronic device according to an embodiment of the disclosure.

FIG. 5 is a view illustrating an operation method in an electronic device according to an embodiment of the disclosure.

Figure 6:
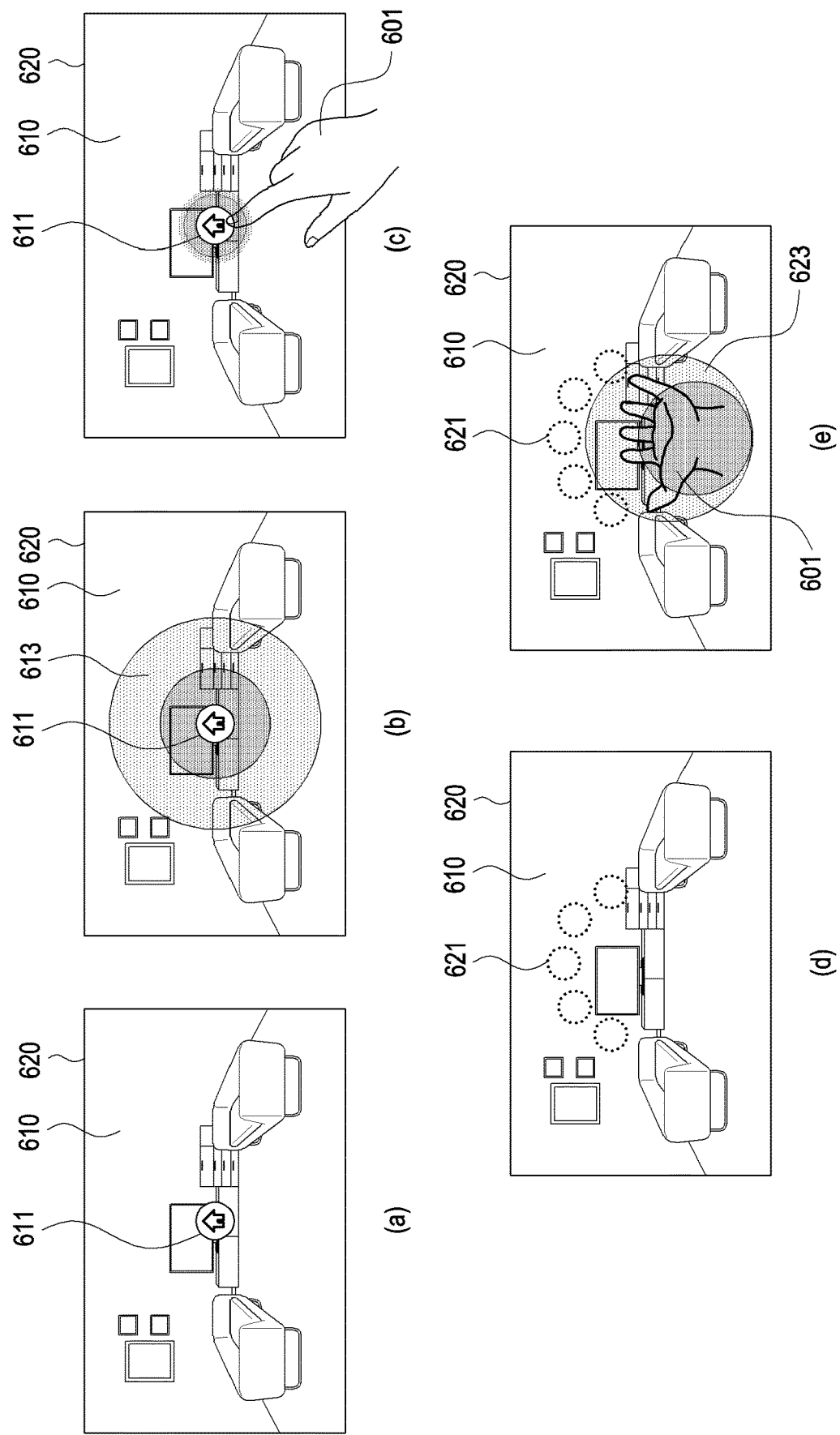
FIG. 6 is a view illustrating an example of an operation method in an electronic device according to an embodiment of the disclosure.

FIG. 6 is a view illustrating an example of an operation method in an electronic device according to an embodiment of the disclosure.

Referring to FIGS. 5 and 6, according to an embodiment, an electronic device (e.g., the electronic device 101 of FIG. 1 or the electronic device 200 of FIG. 2) may display an augmented reality object 611 on an augmented reality space 610 in operation 501. The electronic device may display the image 620 (e.g., 2D or 3D image) corresponding to the real ambient environment captured by the camera module (e.g., the camera module 180 of FIG. 1 or the first camera 211-1 or 211-2 of FIG. 2), on the augmented reality space 610. For example, the augmented reality object 611 may be associated with at least one object included in the image 620 and be displayed overlapping the image 620 and adjacent to at least one associated object.

In operation 503, the electronic device may display the first content 613 anchored by a first anchoring type (e.g., space anchoring type) on the augmented reality object 611. The electronic device may identify the first anchoring type (e.g., space anchoring type) to be applied to the augmented reality object 611 based on anchoring attribute information designated to the augmented reality object 611. The first content 613 may be anchored overlapping and adjacent to the augmented reality object 611. The electronic device may detect the user's motion and move and display the first content 613 anchored to the at least one augmented reality object 611 according to the user's motion.

In operation 505, the electronic device may display a visual effect representing the first anchoring type (e.g., space anchoring) to the first content 613 anchored to the augmented reality object 611. For example, as shown in part (b) of FIG. 6, the electronic device may display a visual effect (e.g., magnify-first-color effect) representing the first anchoring type to the first content 613 to allow the user to recognize the first anchoring type.

In operation 507, the electronic device may identify whether the object attribute of the augmented reality object 611 displayed on the augmented reality space 610 has been changed. When it is identified that the object attribute has been changed, the electronic device may perform operation 505. If the attribute has not been changed, the electronic device may terminate the operation. For example, as shown in FIG. 6, if the electronic device detects the user's hand 601 and detects a user input of selecting the augmented reality object 611, the electronic device may identify that the object attribute of the augmented reality object 611 has been changed.

In operation 509, if the attribute of the augmented reality object is changed, the electronic device may display the augmented reality object 621 having the changed attribute on the augmented reality space 610. The electronic device may detect the user's motion and identify a second anchoring type (e.g., hand anchoring type) based on the object attribute information designated to the augmented reality object 621. For example, as shown in FIG. 6, the augmented reality object 611 may be an object (e.g., home menu) representing a function for controlling the thing (e.g., television (TV)) positioned in the augmented reality space 610. The augmented reality object 621 having the changed attribute may be an object (e.g., sub menu) representing at least one sub function for controlling the thing (e.g., TV) according to the execution of the augmented reality object 611. The augmented reality object 621 may be displayed in various forms depending on the function (e.g., application or program) executed by the selection of the augmented reality object 611.

In operation 511, the electronic device may display second content 623 to which a visual effect representing the second anchoring type identified overlapping and adjacent to the augmented reality object 621 is applied. As shown in FIG. 6, the electronic device may apply a different visual effect (e.g., different color) from the first anchoring type to allow the user to recognize the second anchoring type to the second content 623 and display it. The second content 623 may include a dynamic hand animation corresponding to the user's hand motion. The electronic device may display a visual effect representing the second anchoring type in a different color to the second content 623 to be distinguished from the first content 613.

An operation method in the electronic device is described in detail with reference to the operation method described above in connection with FIG. 4.

Figure 7:
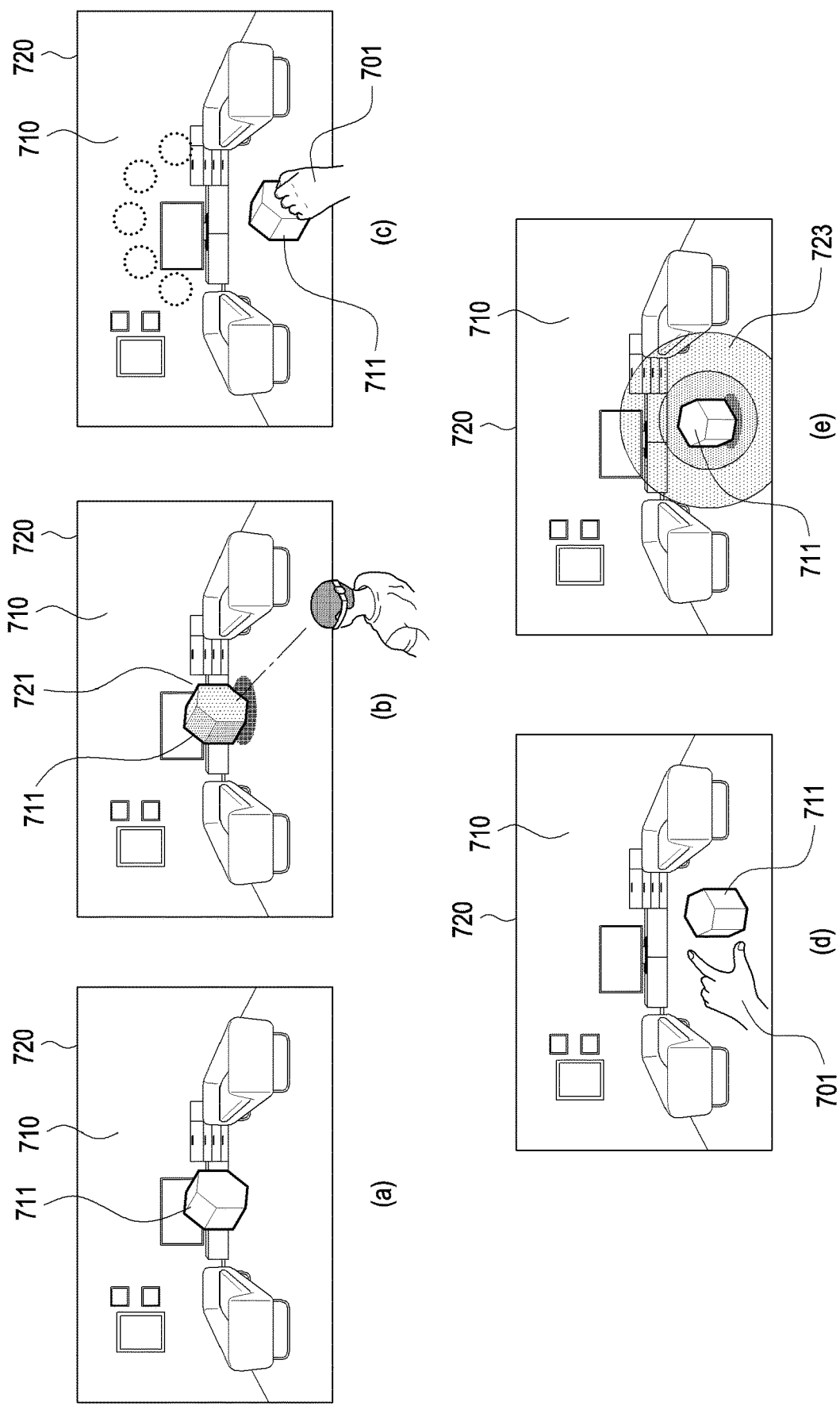
FIG. 7 is a view illustrating an example of an operation method in an electronic device according to an embodiment of the disclosure.

FIG. 7 is a view illustrating an example of an operation method in an electronic device according to an embodiment of the disclosure.

Referring to FIG. 7, according to an embodiment, an electronic device (e.g., the electronic device 101 of FIG. 1 or the electronic device 200 of FIG. 2) may display an image 720 (e.g., 2D or 3D image) corresponding to the real ambient environment captured by the camera module (e.g., the camera module 180 of FIG. 1 or the first camera 211-1 or 211-2 of FIG. 2) and a virtual augmented reality object 711 on an augmented reality space 710 as shown in part (a) of FIG. 7. For example, the augmented reality object 711 may be associated with at least one object included in the image 720 and be displayed on the augmented reality space by the display (e.g., the display module 160 of FIG. 1 or the first display 251 and second display 252 of FIG. 2) overlapping the image 620 and adjacent to the at least one associated object.

According to an embodiment, if an event related to anchoring occurs, the electronic device may identify the anchoring type (e.g., head anchoring type) based on anchoring attribute information designated to the augmented reality object 711 as shown in part (b) of FIG. 7 and, if the user's motion (e.g., head motion) is detected, display the first content 721 to which the visual effect representing the identified anchoring type has been applied to the augmented reality object 711. The first content 721 may be displayed overlapping and adjacent to the augmented reality object 711.

According to an embodiment, as shown in part (c) of FIG. 7, the electronic device may detect a user interaction (e.g., motion of the hand 701) for matching the first content 721 to the image 720 corresponding to the real ambient environment and determine the matching position in the image 720 according to the user interaction. As shown in part (d) of FIG. 7, the electronic device may move the augmented reality object 711 to the matching position, matching the augmented reality object 711 to the image 720 and displaying it so that the augmented reality object 711 is viewed as matching the real ambient environment in the matching position. Here, in the augmented reality object 711, as the object attribute is changed by the user interaction, the anchoring type applied to the object may also be changed. For example, as shown in parts (c) and (d) of FIG. 7, the electronic device may display the first content 721 anchored by the first anchoring type (e.g., head anchoring type) to be maintained when moving and matching the augmented reality object 711. As another example, as shown in parts (c) and (d) of FIG. 7, the electronic device may display the augmented reality object 711, which has been unanchored as the first content 721 anchored by the first anchoring type (e.g., head anchoring type) is removed, when moving and matching the augmented reality object 711. As another example, as shown in parts (c) and (d) of FIG. 7, the electronic device may display the second content 723 anchored by the second anchoring type (e.g., space anchoring type) changed according to a change in the object attribute of the augmented reality object 711 when moving and matching the augmented reality object 711.

The electronic device may apply a visual effect representing the anchoring type (e.g., space anchoring type) changed by matching the augmented reality object 711 to the image 720 corresponding to the real ambient environment and display the second content 723. The electronic device may display the visual effect applied to the second content 723 differently (e.g., in a different color) from the visual effect applied to the first content 721.

Figure 8:
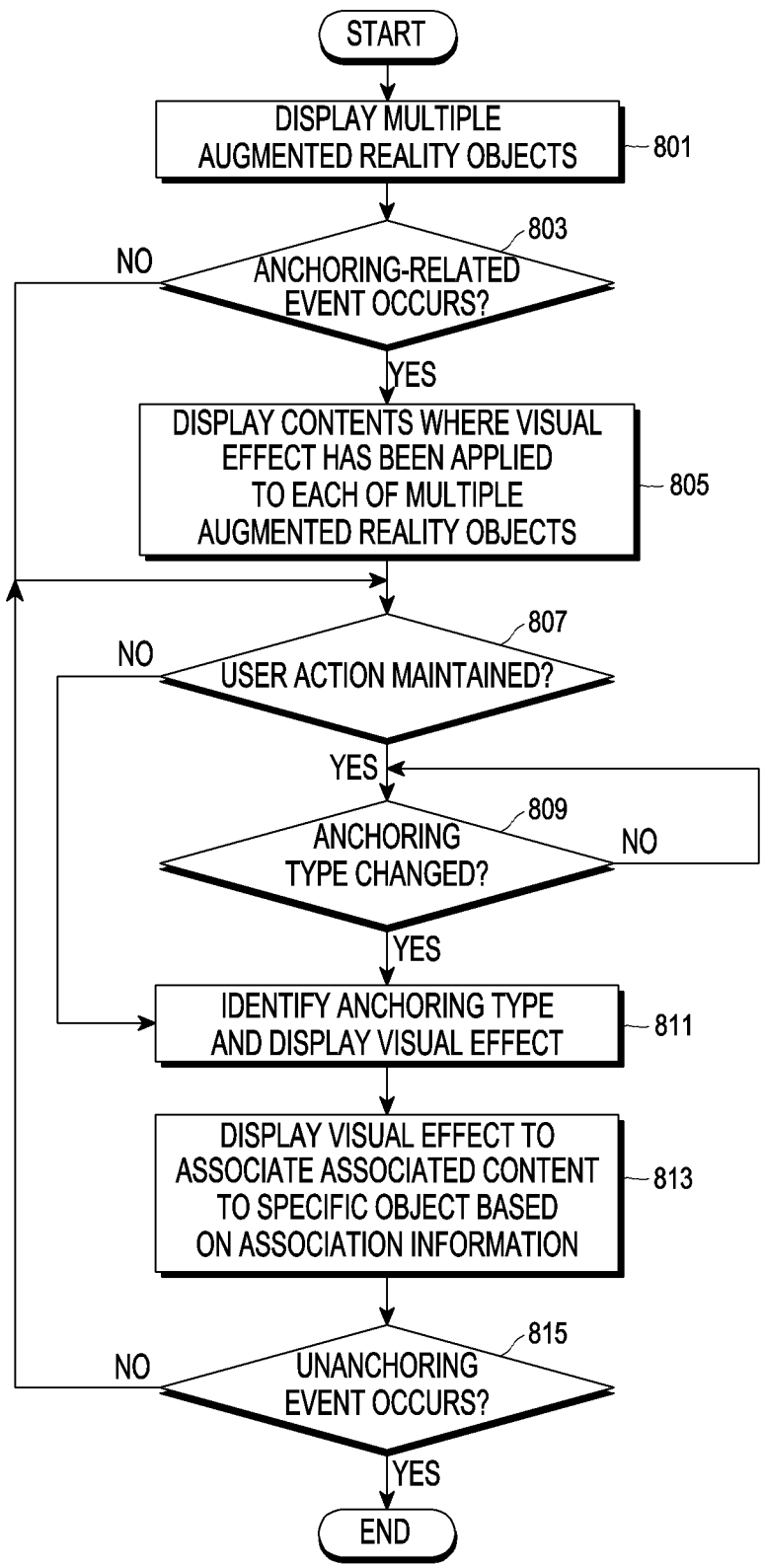
FIG. 8 is a flowchart illustrating an operation method in an electronic device according to an embodiment of the disclosure.

FIG. 8 is a flowchart illustrating an operation method in an electronic device according to an embodiment of the disclosure.

Figure 9A:
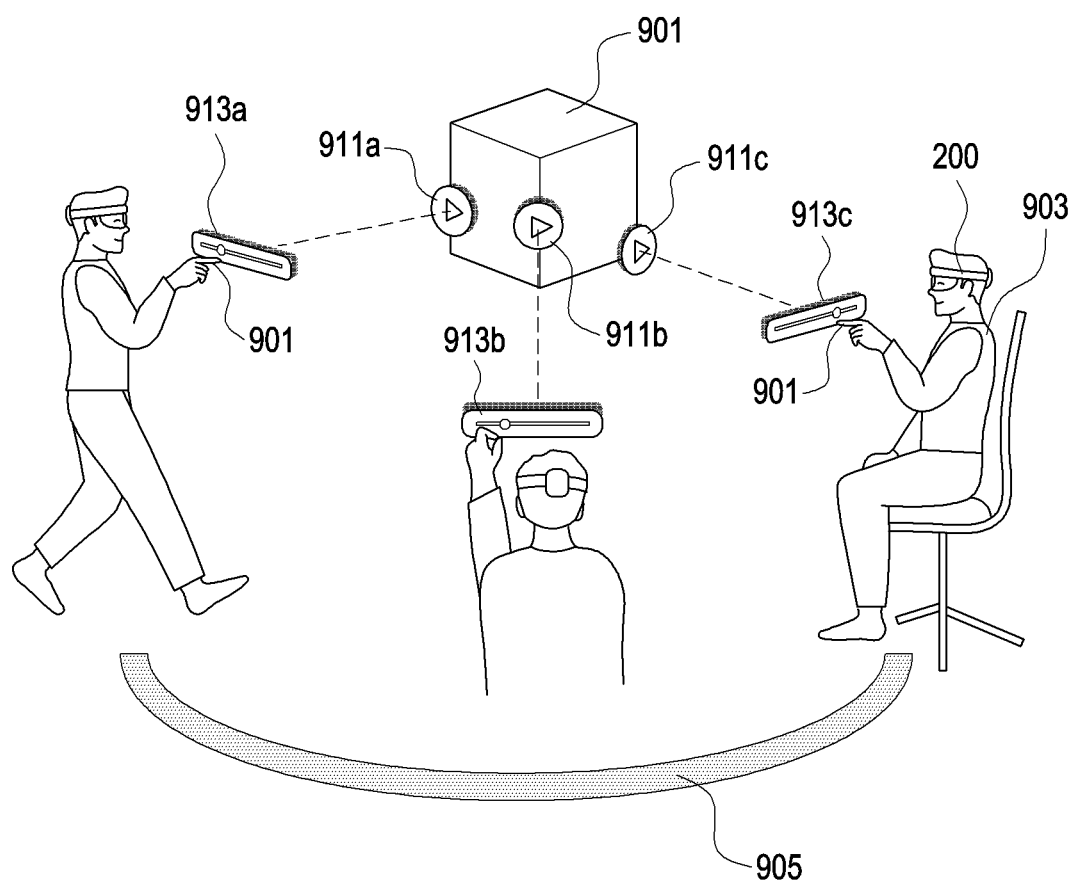
FIGS. 9A and 9B are views illustrating an example of an operation method in an electronic device according to an embodiment of the disclosure.
Figure 9B:
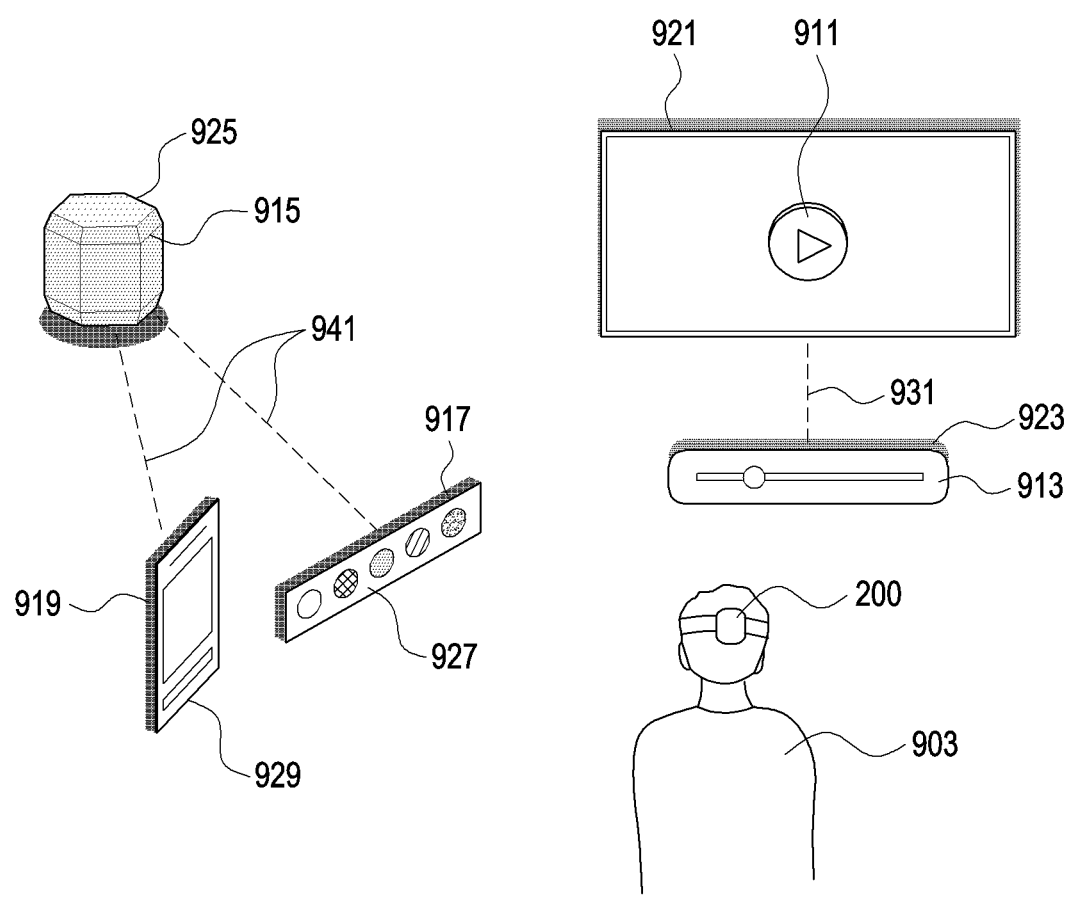

FIGS. 9A and 9B are views illustrating an example of an operation method in an electronic device according to an embodiment of the disclosure.

Referring to FIGS. 8, 9A, and 9B, in operation 801, according to an embodiment, the electronic device (e.g., the electronic device 101 of FIG. 1 or the electronic device 200 of FIG. 2) may display an image (e.g., 2D or 3D image) corresponding to the real ambient environment captured by the camera module (e.g., the camera module 180 of FIG. 1 or the first camera 211-1 or 211-2 of FIG. 2) and a plurality of augmented reality objects 911, 912, 913, 914, and 915 on an augmented reality space.

In operation 803, the electronic device may identify an occurrence of an event related to anchoring for the plurality of augmented reality objects 911, 912, 913, 914, and 915. If an event is identified as occurring, the electronic device may perform operation 805, otherwise operation 807.

In operation 805, the electronic device may display contents 921, 923, 925, 927, and 929 to which the visual effects representing the respective anchoring types of the plurality of augmented reality objects 911, 913, 915, 917, and 919 have been applied. The contents 921, 923, 925, 927 and 929 may be displayed overlapping and adjacent to the augmented reality objects 911, 913, 915, 917 and 919, respectively. Different visual effects may be applied to the contents 921, 923, 925, 927, and 929 for their respective identified anchoring types. For example, the electronic device may display the visual effects by applying the same anchoring type (e.g., space anchoring) to the plurality of augmented reality objects 911, 913, 915, 917, and 919. For example, as shown in FIG. 9A, the electronic device may display each of the contents 921a and 923a in which the visual effects have been applied to the objects 911a and 913a present in the field-of-view area of the user 903. The field-of-view area may be changed as the user 903 moves (e.g., head motion) in the left/right directions 905 with respect to the object 901 corresponding to the real thing displayed on the augmented reality space. If the field-of-view area is changed, the electronic device may display each of the contents 921b and 923b or 921c and 923c in which the visual effects have been applied to the objects 911b and 913b or 911c and 913c present in the changed field-of-view area. The electronic device may apply such an effect as if when the field-of-view area is changed according to the user's motion (e.g., moving to a different location or head motion), the contents 921a and 923a which used to be displayed in the field-of-view area before the change are not displayed or disappear (e.g., display transparently or display the contents to fade out in the direction opposite to the user's motion).

In operation 807, the electronic device may detect the user's motion in the field-of-view area and identify whether the user's motion on the first object 911 among the plurality of augmented reality objects 911, 913, 915, 917, and 919 is maintained for a designated time (e.g., 2 to 3 seconds). If the user's motion is identified as maintained for the designated time, the electronic device may perform operation 809, otherwise operation 811.

In operation 809, the electronic device may identify whether there is an object whose anchoring type has been changed among the plurality of augmented reality objects 911, 913, 915, 917, and 919 according to the user's motion. If there is identified to be an object whose anchoring type has been changed, the electronic device may perform operation 811, otherwise operation 807.

In operation 811, the electronic device may identify that the anchoring type for a specific augmented reality object (hereinafter, the first object 911 as an example) has been changed among the plurality of augmented reality objects 911, 913, 915, 917, and 919). The electronic device may apply the visual effect representing the changed anchoring type (e.g., head anchoring type) to the first content 921 anchored to the first object 911 and display it.

In operation 813, the electronic device may identify the association between the plurality of augmented reality objects 911, 913, 915, 917, and 919. The electronic device may group and classify the contents associated with each other and associate the contents included in the same group and apply visual effects 931 and 941 (e.g., display connection lines, content grouping, or same symbol (or mark)) representing the association, and display them. The electronic device may identify the association based on the association information included in the anchoring identification information about each of the plurality of augmented reality objects 911, 913, 915, 917, and 919 or identify the association separately for each anchoring type.

In operation 815, the electronic device may identify whether an event related to unanchoring occurs. If an event related to unanchoring is identified as occurring, the electronic device may terminate the operation, otherwise perform operation 807, repeating the operations for applying the visual effect to the content anchored to the objects according to the user's motion.

FIGS. 10A, 10B, 10C, 10D, and 10E are views illustrating an example of an operation method in an electronic device according to an embodiment of the disclosure.

Figure 10A:
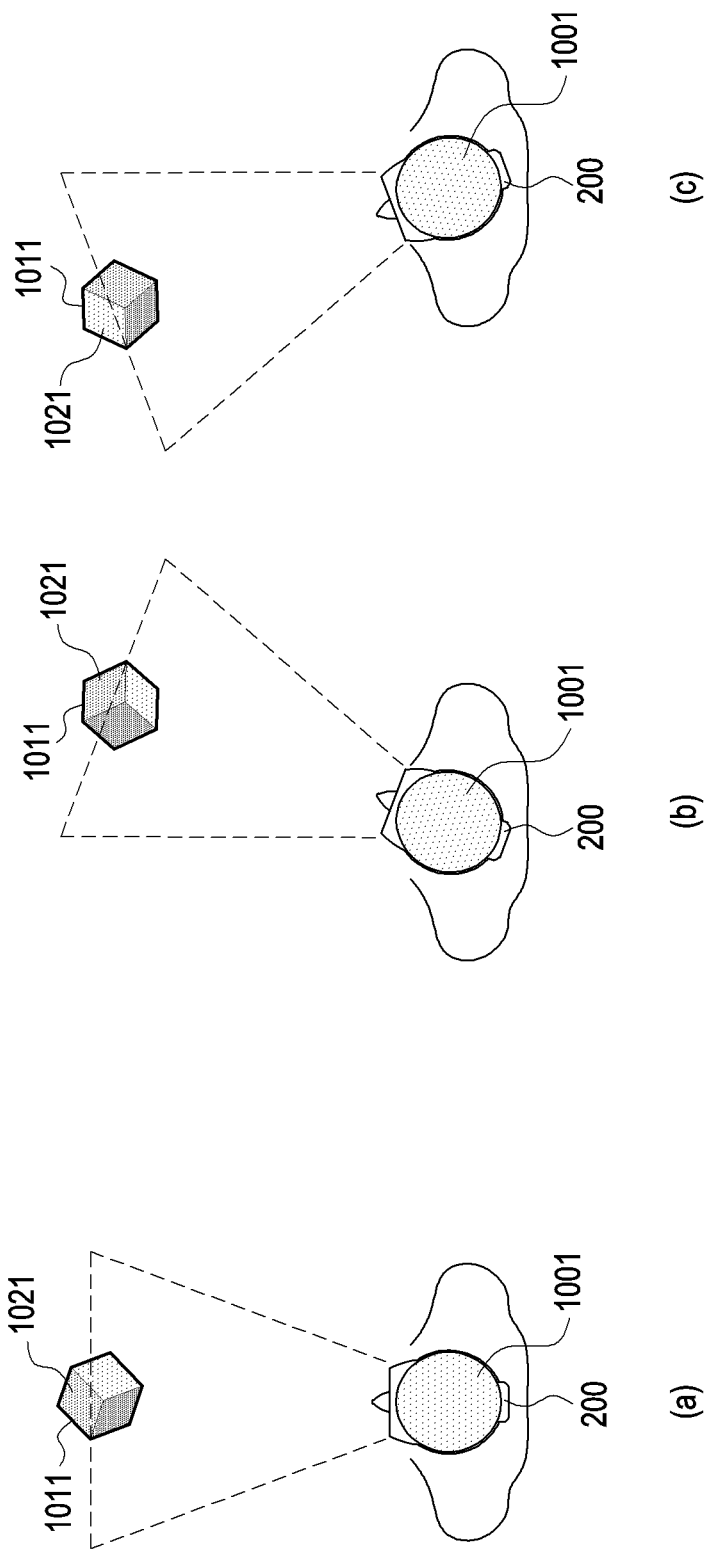
FIGS. 10A, 10B, 10C, 10D, and 10E are views illustrating an example of an operation method in an electronic device according to an embodiment of the disclosure.

Referring to FIG. 10A, according to an embodiment, an electronic device 200 (e.g., the electronic device 101 of FIG. 1 or the electronic device 200 of FIG. 2) may move and display the content 1021 anchored overlapping and adjacent to the augmented reality object 1011 according to the motion of the user's head 1001 when the anchoring type to be applied to the augmented reality object 1011 displayed on the augmented reality space is the head anchoring type as shown in parts (a), (b), and (c) of FIG. 10A. The electronic device 200 may apply the visual effect representing the head anchoring type to allow the user to recognize head anchoring type to the content 1021 and display it. The electronic device 200 may display the content 1021 not to depart from the user's field-of-view area 1031.

Figure 10B:
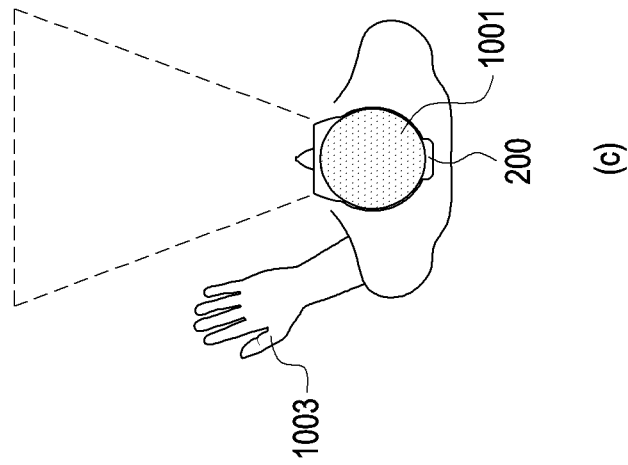
Figure 10B:
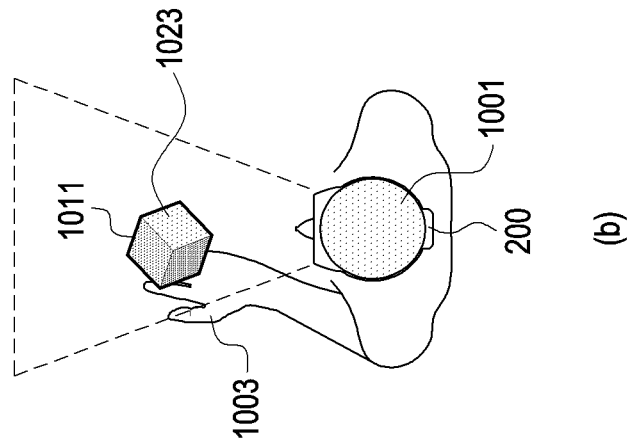
Figure 10B:
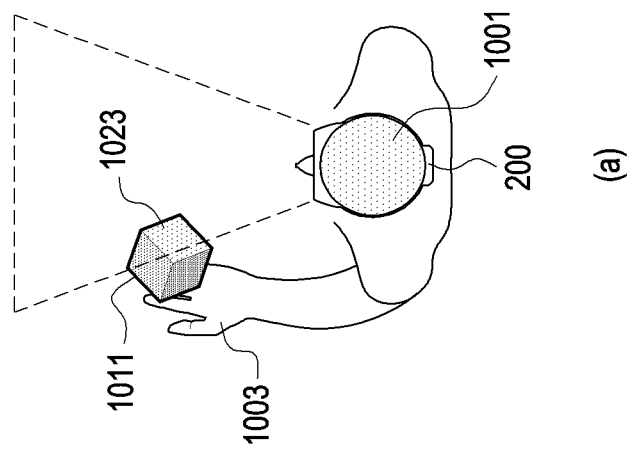

Referring to FIG. 10B, according to an embodiment, when the anchoring type to be applied to the augmented reality object 1011 displayed on the augmented reality space is the hand anchoring type, the electronic device 200 may move and display the content 1023 anchored overlapping and adjacent to the augmented reality object 1011 according to the motion of the user's hand 1003 with respect to the user's head 1001. The electronic device 200 may apply the visual effect representing the hand anchoring type to allow the user to recognize hand anchoring type to the content 1023 and display it. As shown in part (a) of FIG. 10B, the electronic device 200 may detect the user's hand 1003 and, if it is maintained for a predetermined time, identify the hand anchoring type by the motion of the user's hand 1003. As shown in part (b) of FIG. 10B, upon detecting a motion of the user's hand 1003 within the field-of-view area 1031, the electronic device may move and display the content 1023 in response to the hand motion. As shown in part (c) of FIG. 10B, upon detecting that the user's hand 1003 departs from the field-of-view area, the electronic device may control the display module 160 to apply such an effect as if the content disappears out of the field-of-view area and display the content to be transparent or disappear. If the user's hand 1003 enters back into the field-of-view area 1031, the electronic device may apply such an effect as if the content 1023 appears back or display the content 1023 again.

Figure 10C:
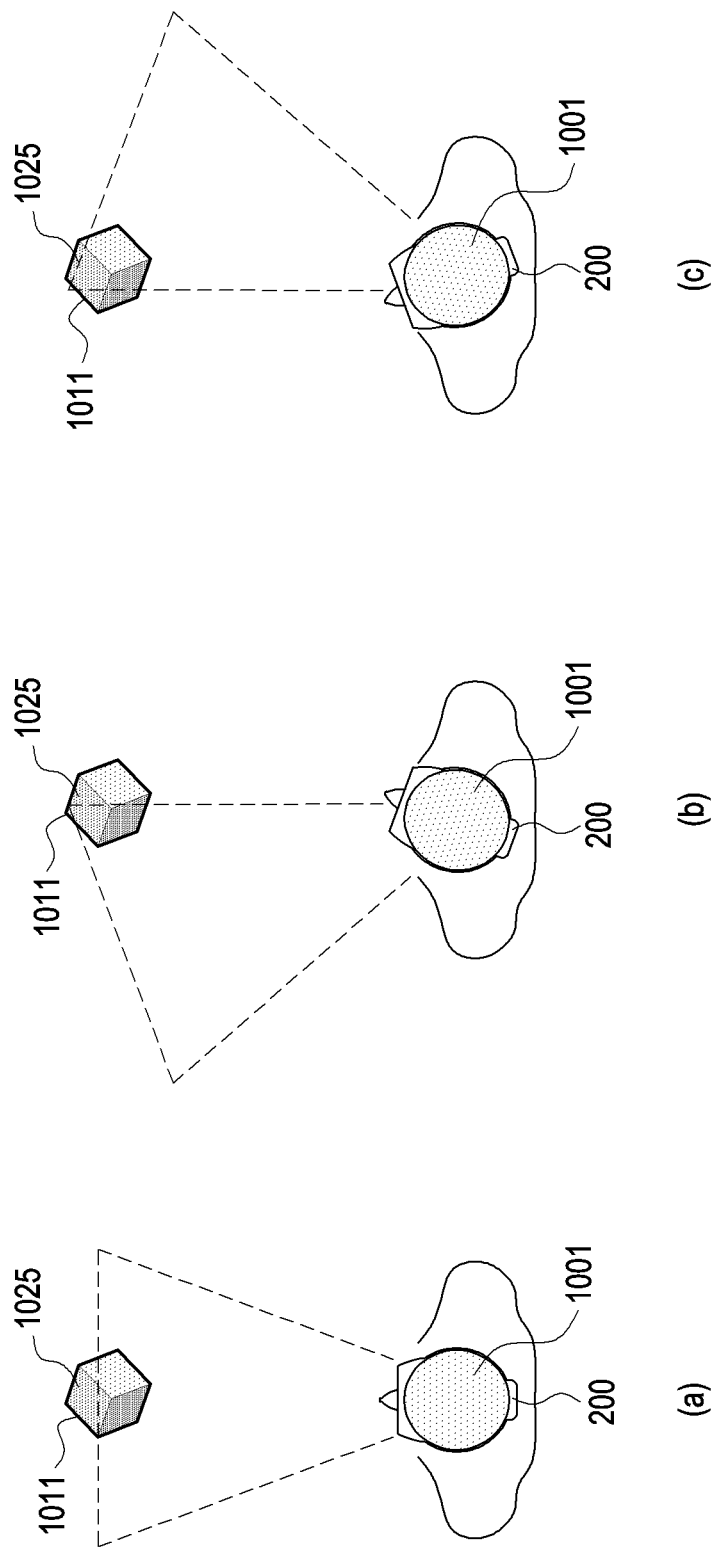

Referring to FIG. 10C, according to an embodiment, when the anchoring type to be applied to the augmented reality object 1011 displayed on the augmented reality space is the space anchoring type, the electronic device 200 may fix and display the content 1025 anchored overlapping and adjacent to the augmented reality object 1011 in a designated position of the augmented reality space. Here, as shown in parts (a), (b), and (c) of FIG. 10C, the content 1025 is fixed and displayed in the designated position without being moved according to the user's motion. The electronic device 200 may apply the visual effect representing the space anchoring type to allow the user to recognize space anchoring to the content 1025 and display it.

Figure 10D:
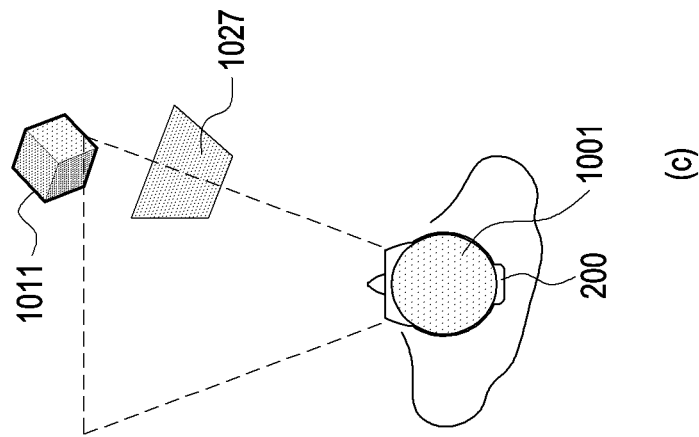
Figure 10D:
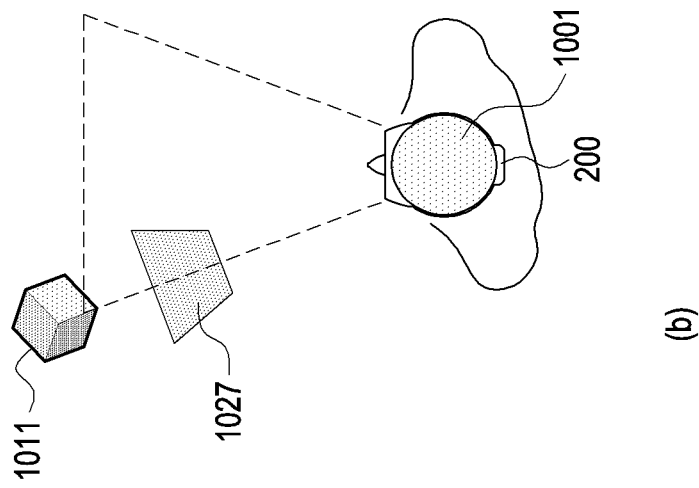
Figure 10D:
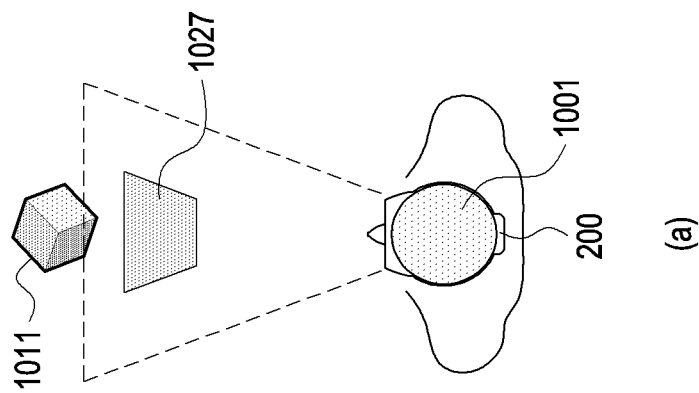

Referring to FIG. 10D, according to an embodiment, when the anchoring type to be applied to the augmented reality object 1011 displayed on the augmented reality space is the object anchoring type, the electronic device 200 may display the content 1027 anchored to maintain a predetermined distance adjacent to the augmented reality object 1011. As shown in parts (a), (b), and (c) of FIG. 10D, the electronic device may move and display the content 1027 according to the user's motion while maintaining the predetermined distance from the augmented reality object 1011 with the augmented reality object 1011 fixed but not moved. The electronic device 200 may move (or rotate) and provide the content 1027 according to the user's motion so that the user is viewed all the time within the field-of-view area 1031. The electronic device 200 may apply the visual effect representing the object anchoring type to allow the user to recognize object anchoring to the content 1027 and display it.

Figure 10E:
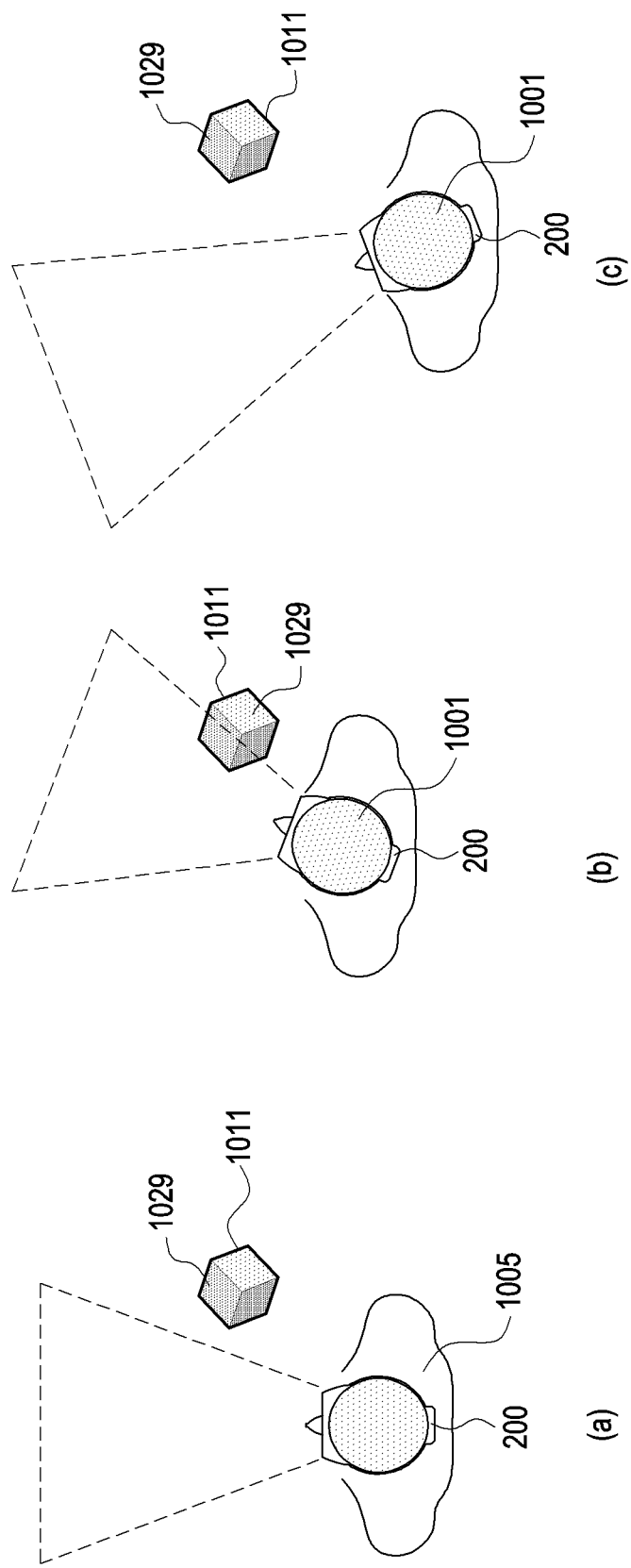

Referring to FIG. 10E, according to an embodiment, when the anchoring type to be applied to the augmented reality object 1011 displayed on the augmented reality space is the body anchoring type, the electronic device 200 may move and display the content 1029 anchored overlapping and adjacent to the augmented reality object 1011 according to the motion of the user's body while maintaining a predetermined distance from the user's body as shown in parts (a), (b), and (c) of FIG. 10E. The electronic device 200 may apply the visual effect representing the body anchoring type to allow the user to recognize body anchoring type to the content 1029 and display it.

According to an embodiment, a method for operation in an electronic device (e.g., the electronic device 101 of FIGS. 1 and 2) may comprise controlling a display (e.g., the display module 160 of FIG. 1 or the first display 251 and second display 252 of FIG. 2) of the electronic device to display at least one augmented reality object on an augmented reality space, obtaining anchoring attribute information designated to the at least one augmented reality object, identifying an anchoring type of content anchored to the at least one augmented reality object according to a user's motion based on the anchoring attribute information, and controlling the display of the electronic device to display a visual effect representing the anchoring type to the content.

According to an embodiment, the visual effect representing the anchoring type may be set differently from a visual effect set to another anchoring type.

According to an embodiment, the method may further comprise, based on an attribute of the at least one augmented reality object having changed, identifying a change in another anchoring type according to the changed attribute and controlling the display to display another visual effect representing the changed, other anchoring type to the content.

According to an embodiment, the method may further comprise the display to move and display the at least one augmented reality object based on the user's motion to match the at least one augmented reality object to the augmented reality space, determining a matching position in response to the user's motion, matching the augmented reality object to an image corresponding to a real ambient environment displayed on the augmented reality space in the determined matching position, and based on the anchoring type of the augmented reality object having changed, controlling the display to display a visual effect representing the changed anchoring type.

According to an embodiment, controlling the display to display the visual effect representing the anchoring type may include, in a case in which the anchoring type is space anchoring, controlling the display to fix and display, in a designated position of the augmented reality space, content to which a visual effect representing the space anchoring is applied, while overlapping or being adjacent to the augmented reality object.

According to an embodiment, controlling of the display to display the visual effect representing the anchoring type may include, in a case in which the anchoring type is a hand anchoring type, controlling the display to move and display content to which a visual effect representing the hand anchoring type is applied, according to a motion of the user's hand with respect to the user's head, while overlapping or being adjacent to the augmented reality object, and in a case in which the anchoring type is head anchoring, controlling the display to move and display content to which a visual effect representing the head anchoring is applied, according to a motion of the user's head, while overlapping or being adjacent to the augmented reality object.

According to an embodiment, controlling of the display to display the visual effect representing the anchoring type may include, in a case in which the anchoring type is body anchoring, controlling the display to move and display content to which a visual effect representing the body anchoring is applied, according to a motion of the user's body, while overlapping or being adjacent to the augmented reality object. The content may be moved while maintaining a predetermined distance from the user's body.

According to an embodiment, controlling of the display to display the visual effect representing the anchoring type may include, in a case in which the anchoring type is object anchoring, controlling the display to display content to which a visual effect representing the object anchoring is applied while maintaining a designated distance from the augmented reality object and move and display the content according to the user's motion.

According to an embodiment, the method may further comprise, in a case in which a plurality of augmented reality objects are displayed on the augmented reality space, controlling the display to display each of contents to which visual effects representing anchoring types respectively for the plurality of augmented reality objects are applied, identifying an association between the plurality of augmented reality objects and classifying objects associated with each other, and controlling the display to display a visual effect representing the association to the classified objects.

According to an embodiment, there may be provided a non-transitory storage medium storing a program including instructions that, when executed by a processor of an electronic device, enable the electronic device to control a display of the electronic device to display at least one augmented reality object on an augmented reality space, obtain anchoring attribute information designated to the at least one augmented reality object, identify an anchoring type of content anchored to the at least one augmented reality object according to a user's motion based on the anchoring attribute information, and control the display of the electronic device to display a visual effect representing the anchoring type to the content.

The embodiments disclosed herein are proposed for description and understanding of the disclosed technology and does not limit the scope of the disclosure. Accordingly, the scope of the disclosure should be interpreted as including all changes or another embodiment based on the technical spirit of the disclosure.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   memory storing one or more computer programs;
   a display; and
   at least one processor including processing circuitry,
   wherein the one or more computer programs include computer-executable instructions that, when executed by the at least one processor individually or collectively, cause the electronic device to:
   control the display to display at least one augmented reality object on an augmented reality space,
   based on a first user interaction, identify an attribute including anchoring attribute information of the at least one augmented reality object,
   based on the identified attribute, identify an anchoring type corresponding to content anchored to the at least one augmented reality object by the first user interaction among a plurality of anchoring types,
   control the display to display a first visual effect overlapping the at least one augmented reality object so as to partially obscure the at least one augmented reality object, the first visual effect representing the anchoring type to the content,
   based on identifying that the attribute of the at least one augmented reality object is changed by a second user interaction, control the display to display the at least one augmented reality object with the changed attribute and identify another anchoring type corresponding to the content among the plurality of anchoring types, and control the display to display a second visual effect representing the other anchoring type, and
wherein the first visual effect representing the anchoring type is different the second visual effect representing the other anchoring type.

2. The electronic device of claim 1, wherein the one or more computer programs further comprise include computer-executable instructions that, when executed by the at least one processor individually or collectively, cause the electronic device to:
control the display to move and display the at least one augmented reality object in response to the user interaction to match the at least one augmented reality object to the augmented reality space,
determine a matching position based on the user interaction,
match the augmented reality object to an image corresponding to a real ambient environment displayed on the augmented reality space in the determined matching position,
wherein the plurality of anchoring types includes a space anchoring type, a hand anchoring type, a head anchoring type, a body anchoring type and an object anchoring type, and
wherein each of the plurality of anchoring types is set to apply different visual effect to the content.

3. The electronic device of claim 1, wherein the one or more computer programs further comprise include computer-executable instructions that, when executed by the at least one processor individually or collectively, cause the electronic device to:
in a case in which the anchoring type is a space anchoring type among the plurality of anchoring types, control the display to fix and display, in a designated position of the augmented reality space, content to which a visual effect representing the space anchoring type is applied, while overlapping or being adjacent to the augmented reality object.

4. The electronic device of claim 1, wherein the one or more computer programs further comprise include computer-executable instructions that, when executed by the at least one processor individually or collectively, cause the electronic device to:
in a case in which the anchoring type is a hand anchoring type among the plurality of anchoring types, control the display to move and display content to which a visual effect representing the hand anchoring type is applied, according to a motion of a hand of the user with respect to a head of the user, while overlapping or being adjacent to the augmented reality object.

5. The electronic device of claim 1, wherein the one or more computer programs further comprise include computer-executable instructions that, when executed by the at least one processor individually or collectively, cause the electronic device to:
in a case in which the anchoring type is a head anchoring type among the plurality of anchoring types, control the display to move and display content to which a visual effect representing the head anchoring type is applied, according to a motion of a head of the user, while overlapping or being adjacent to the augmented reality object.

6. The electronic device of claim 1,
wherein the one or more computer programs further comprise include computer-executable instructions that, when executed by the at least one processor individually or collectively, cause the electronic device to:
in a case in which the anchoring type is a body anchoring type among the plurality of anchoring types, control the display to move and display content to which a visual effect representing the body anchoring type is applied, according to a motion of a body of the user, while overlapping or being adjacent to the augmented reality object, and
wherein the content is moved while maintaining a predetermined distance from the body of the user.

7. The electronic device of claim 1, wherein the one or more computer programs further comprise include computer-executable instructions that, when executed by the at least one processor individually or collectively, cause the electronic device to:
in a case in which the anchoring type is an object anchoring type among the plurality of anchoring types, control the display to display content to which a visual effect representing the object anchoring type is applied while maintaining a designated distance from the augmented reality object and move and display the content according to a motion of the user.

8. The electronic device of claim 1, wherein the one or more computer programs further comprise include computer-executable instructions that, when executed by the at least one processor individually or collectively, cause the electronic device to:
in a case in which a plurality of augmented reality objects are displayed on the augmented reality space, control the display to display each of contents to which visual effects representing anchoring types respectively for the plurality of augmented reality objects are applied,
identify an association between the plurality of augmented reality objects and classify objects associated with each other, and
control the display to display a visual effect representing the association to the classified objects.

9. The electronic device of claim 1, wherein the visual effect comprises at least one of a color, a shadow, a shading, a gradation effect, a shadow effect, a magnify effect, or a graphic element.

10. A method performed by an electronic device, the method comprising:
controlling, by the electronic device, a display of the electronic device to display at least one augmented reality object on an augmented reality space;
based on a first user interaction, identifying, by the electronic device, an attribute including anchoring attribute information of the at least one augmented reality object;
based on the identified attribute, identifying, by the electronic device, an anchoring type corresponding to content anchored to the at least one augmented reality object by the first user interaction among a plurality of anchoring types;
controlling, by the electronic device, the display to display a first visual effect overlapping the at least one augmented reality object so as to partially obscure the at least one augmented reality object, the first visual effect representing the anchoring type to the content ;
based on identifying that the attribute of the at least one augmented reality object is changed by a second user interaction, controlling the display to display the at least one augmented reality object with the changed attribute and identify another anchoring type corresponding to the content among the plurality of anchoring types; and controlling the display to display a second visual effect representing the other anchoring type; and wherein the first visual effect representing the anchoring type is different the second visual effect representing the other anchoring type.

11. The method of claim 10, further comprising:

controlling the display to move and display the at least one augmented reality object based on the user interaction to match the at least one augmented reality object to the augmented reality space;

determining a matching position in response to the user interaction; and matching the augmented reality object to an image corresponding to a real ambient environment displayed on the augmented reality space in the determined matching position,;

wherein the plurality of anchoring types includes a space anchoring type, a hand anchoring type, a head anchoring type, a body anchoring type and an object anchoring type, and wherein each of the plurality of anchoring types is set to apply different visual effect to the content.

12. The method of claim 10, wherein controlling of the display to display the visual effect representing the anchoring type includes:

in a case in which the anchoring type is a space anchoring type among the plurality of anchoring types, controlling the display to fix and display, in a designated position of the augmented reality space, content to which a visual effect representing the space anchoring type is applied, while overlapping or being adjacent to the augmented reality object.

13. The method of claim 10, wherein controlling of the display to display the visual effect representing the anchoring type includes:

in a case in which the anchoring type is a hand anchoring type among the plurality of anchoring types, controlling the display to move and display content to which a visual effect representing the hand anchoring type is applied, according to a motion of a hand of the user with respect to a head of the user, while overlapping or being adjacent to the augmented reality object; and in a case in which the anchoring type is a head anchoring type among the plurality of anchoring types, controlling the display to move and display content to which a visual effect representing the head anchoring type is applied, according to a motion of the head of the user, while overlapping or being adjacent to the augmented reality object.

14. The method of claim 10, wherein controlling of the display to display the visual effect representing the anchoring type includes:

in a case in which the anchoring type is a body anchoring type among the plurality of anchoring types, controlling the display to move and display content to which a visual effect representing the body anchoring type is applied, according to a motion of a body of the user, while overlapping or being adjacent to the augmented reality object, and wherein the content is moved while maintaining a predetermined distance from the body of the user.

15. The method of claim 10, wherein controlling of the display to display the visual effect representing the anchoring type includes:

in a case in which the anchoring type is an object anchoring type among the plurality of anchoring types, controlling the display to display content to which a visual effect representing the object anchoring type is applied while maintaining a designated distance from the augmented reality object and move and display the content according to a motion of the user.

16. The method of claim 10, further comprising:

in a case in which a plurality of augmented reality objects are displayed on the augmented reality space, controlling the display to display each of contents to which visual effects representing anchoring types respectively for the plurality of augmented reality objects are applied;

identifying an association between the plurality of augmented reality objects and classifying objects associated with each other; and controlling the display to display a visual effect representing the association to the classified objects.

17. A non-transitory computer-readable storage media storing one or more computer programs including computer-executable instructions that, when executed by one or more processors of an electronic device individually or collectively, cause the electronic device to perform operations, the operations comprising:

controlling, by the electronic device, a display of the electronic device to display at least one augmented reality object on an augmented reality space;

based on a first user interaction, identifying, by the electronic device, an attribute including anchoring attribute information of the at least one augmented reality object;

based on the identified attribute, identifying, by the electronic device, an anchoring type corresponding to content anchored to the at least one augmented reality object according to by the first user interaction among a plurality of anchoring types;

controlling, by the electronic device, the display to display a first visual effect overlapping the at least one augmented reality object so as to partially obscure the at least one augmented reality object, the first visual effect representing the anchoring type to the content;

based on identifying that the attribute of the at least one augmented reality object is changed by a second user interaction, controlling the display to display the at least one augmented reality object with the changed attribute and identify another anchoring type corresponding to the content among the plurality of anchoring types; and controlling the display to display a second visual effect representing the other anchoring type, wherein the first visual effect representing the anchoring type is different the second visual effect representing the other anchoring type.

* * * * *